US012434147B2

(12) United States Patent
Hirata et al.

(10) Patent No.: US 12,434,147 B2
(45) Date of Patent: Oct. 7, 2025

(54) INFORMATION PROCESSING APPARATUS, RECORDING MEDIUM, AND USAGE OBJECT CREATING METHOD

(71) Applicant: KOEI TECMO GAMES CO., LTD., Kanagawa (JP)

(72) Inventors: Kotaro Hirata, Kanagawa (JP); Shota Iwasa, Kanagawa (JP); Takuto Edagawa, Kanagawa (JP); Yu Oboshi, Kanagawa (JP); Tatsuto Tsuchishita, Kanagawa (JP)

(73) Assignee: KOEI TECMO GAMES CO. LTD., Kanagawa (JP)

(*) Notice: Subject to any disclaimer, the term of this patent is extended or adjusted under 35 U.S.C. 154(b) by 340 days.

(21) Appl. No.: 18/054,976

(22) Filed: Nov. 14, 2022

(65) Prior Publication Data

US 2023/0149814 A1 May 18, 2023

(30) Foreign Application Priority Data

Nov. 15, 2021 (JP) ................................ 2021-185686
Nov. 1, 2022 (JP) ................................ 2022-175780

(51) Int. Cl.
*A63F 13/56* (2014.01)
*A63F 13/822* (2014.01)

(52) U.S. Cl.
CPC ............ *A63F 13/56* (2014.09); *A63F 13/822* (2014.09); *A63F 2300/6607* (2013.01); *A63F 2300/807* (2013.01)

(58) Field of Classification Search
CPC .................... A63F 13/56; A63F 13/822; A63F 2300/6607; A63F 2300/807; A63F 13/57; A63F 13/573; A63F 13/577; A63F 13/58; A63F 13/5372; A63F 13/5375
See application file for complete search history.

(56) References Cited

U.S. PATENT DOCUMENTS 10,905,952 B2* 2/2021 Nomura .................. A63F 13/45
11,093,121 B2* 8/2021 Nishida ............... G06F 3/04842
2012/0102028 A1* 4/2012 Nakata .................... A63F 13/63 707/736

(Continued)

FOREIGN PATENT DOCUMENTS

WO 2019/138458 7/2019

*Primary Examiner* — David L Lewis
*Assistant Examiner* — Matthew D Hoel
(74) *Attorney, Agent, or Firm* — SOLARIS Intellectual Property Group, PLLC

(57) ABSTRACT

An information processing apparatus is configured to execute a game in which a user character takes action in a field in a virtual space based on an operation by a user. The information processing apparatus includes a material providing unit configured to provide, to the user character, a material object according to a position in the field of the user character that is taking action; a temporary display unit configured to temporarily display a usage object that the user character can create according to the position in the field of the user character that is taking action; and a usage object creating unit configured to create, in the field, the usage object that is being temporarily displayed, from the material object possessed by the user character, based on an operation of the user.

12 Claims, 26 Drawing Sheets

(56) References Cited

U.S. PATENT DOCUMENTS

| | | | | |
|---|---|---|---|---|
| 2016/0034860 | A1* | 2/2016 | Sakamoto | G06F 3/0481 463/25 |
| 2021/0065027 | A1* | 3/2021 | Yamamoto | A63F 13/67 |
| 2023/0149814 | A1* | 5/2023 | Hirata | A63F 13/56 463/31 |
| 2024/0149164 | A1* | 5/2024 | Mizuki | A63F 13/426 |
| 2024/0299846 | A1* | 9/2024 | Tachihara | A63F 13/20 |

* cited by examiner

FIG.4

USER CHARACTER DB (A)

| POSITION INFORMATION |
| --- |
| (x1,y1,z1) |

(B)

| POSSESSED MATERIAL INFORMATION |
| --- |
| A001×10 A002×1 A003×5 … A999×3 … |

(C)

| POSITION INFORMATION | CREATED USAGE OBJECT ID |
| --- | --- |
| (x1,y1,z1) | X001 |
| (x5,y5,z1) | X002 |
| … | … |

FIG.5

USAGE OBJECT INFORMATION DB

| USAGE OBJECT ID | NECESSARY MATERIAL INFORMATION | SHAPE INFORMATION | IMAGE DATA | … |
|---|---|---|---|---|
| X001 | A001 × 5 | SHAPE 001 | IMAGE 001 | … |
| X002 | A001 × 2  A002 × 2 | SHAPE 002 | IMAGE 002 | … |
| X003 | A001 × 5  A003 × 2  A999 × 1 | SHAPE 003 | IMAGE 003 | … |
| … | … | … | … | … |

FIG.6

MATERIAL DB

| POSITION INFORMATION | MATERIAL OBJECT INFORMATION | IMAGE DATA | … |
|---|---|---|---|
| (x11,y11,z11) | A001 × 5 | IMAGE 101 | … |
| (x22,y22,z22) | A002 × 10 | IMAGE 102 | … |
| (x33,y33,z33) | A003 × 1 | IMAGE 103 | … |
| … | … | … | … |

FIG.7

USAGE OBJECT CREATION POSSIBLE POSITION DB

| USAGE OBJECT ID | CREATION POSSIBLE POSITION INFORMATION | ... |
|---|---|---|
| X001 | (x1,y1,z1) | ... |
| X002 | (x5,y5,z1) | ... |
| X003 | (x50,y50,z10) | ... |
| ... | ... | ... |

FIG.13

USER CHARACTER DB (A)

| POSITION INFORMATION |
| --- |
| (x1,y1,z1) |

(B)

| POSSESSED MATERIAL INFORMATION |
| --- |
| A001×10 A002×1 A003×5 … A999×3 … |

(C)

| POSITION INFORMATION | CREATED USAGE OBJECT ID |
| --- | --- |
| (x1,y1,z1) | X001 |
| (x5,y5,z1) | X002 |
| … | … |

(D)

| POSITION INFORMATION | CREATED LINK USAGE OBJECT ID |
| --- | --- |
| (x100,y100,z100) | Y001 |
| (x150,y150,z200) | Y002 |
| … | … |

FIG.14

LINK USAGE OBJECT INFORMATION DB

| LINK USAGE OBJECT ID | NECESSARY USAGE OBJECT INFORMATION | ARRANGEMENT SHAPE INFORMATION | IMAGE DATA | PERFORMANCE FUNCTION | … |
|---|---|---|---|---|---|
| Y001 | X001 × 6 | SHAPE 001 | IMAGE 001 | STRENGTH 100 WALL | … |
| Y002 | X001 × 6 | SHAPE 002 | IMAGE 002 | BRIDGE | … |
| Y003 | X002 × 9 | SHAPE 003 | IMAGE 003 | STRENGTH 200 WALL | … |
| Y004 | X001 × 3 X002 × 3 | SHAPE 004 | IMAGE 004 | TOWER | … |
| … | … | … | … | … | … |

FIG.19

LEARNING CONDITION INFORMATION DB

| LINK USAGE OBJECT ID | LEARNING CONDITION | LEARNED FLAG | … |
|---|---|---|---|
| Y001 | WATCH THE RUSHING ATTACK OF AN ENEMY CHARACTER a | ON | … |
| Y002 | WATCH A VALLEY LANDFORM WITH A WIDTH OF 5 m OR MORE | ON | … |
| Y003 | WATCH THE ATTACK OF THE ENEMY CHARACTER a ON X001 × 6 ARRANGED IN A SHAPE 001 | OFF | … |
| … | … | … | … |

FIG.24

| | USAGE OBJECT | LINK USAGE OBJECT |
|---|---|---|
| NPC | CANNOT SET | IMMEDIATELY DESTROY WHEN SETTING |
| LARGE ENEMY CHARACTER | DESTROY TIMER AFTER SETTING | IMMEDIATELY DESTROY WHEN SETTING |
| SMALL ENEMY CHARACTER | PUSH EACH OTHER | PUSH EACH OTHER |

FIG.25C

| | |
|---|---|
| PICKET | PICKET |
| LEAP | LEAP |
| LEAP | LEAP |

FIG.25D

| | |
|---|---|
| FIRE | FIRE |
| FIRE | FIRE |
| FIRE | FIRE |

INFORMATION PROCESSING APPARATUS, RECORDING MEDIUM, AND USAGE OBJECT CREATING METHOD

CROSS-REFERENCE TO RELATED APPLICATION

The present application is based on and claims priority under 35 U.S.C. § 119 to Japanese Patent Application No. 2021-185686, filed on Nov. 15, 2021 and Japanese Patent Application No. 2022-175780, filed on Nov. 1, 2022, the contents of which are incorporated herein by reference in their entirety.

BACKGROUND OF THE INVENTION

1. Field of the Invention

The present disclosure relates to an information processing apparatus, a recording medium, and a usage object creating method.

2. Description of the Related Art

In recent years, games that allow game characters to perform various actions in response to user input operations have become common. Conventional games include craft games, such as Minecraft (registered trademark), in which game characters collect materials in fields to make things (crafting), in response to user input operations (see, for example, Patent Document 1).

Patent Document 1: WO 2019/138458 (paragraph number 0108)

For example, in a conventional craft game, after a user character is caused to take action to collect the materials needed for making things, the user must perform an operation for starting making things and display a screen for crafting; otherwise, making things cannot be performed. The problem with conventional craft games is that it is difficult to make the user notice the position where making things is to be performed in the field.

A problem to be addressed by an embodiment of the present invention is to cause a user to notice the position where a usage object is to be created, from a material object.

SUMMARY OF THE INVENTION

According to one aspect of the present invention, there is provided an information processing apparatus configured to execute a game in which a user character takes action in a field in a virtual space based on an operation by a user, the information processing apparatus including a material providing unit configured to provide, to the user character, a material object according to a position in the field of the user character that is taking action; a temporary display unit configured to temporarily display a usage object that the user character can create according to the position in the field of the user character that is taking action; and a usage object creating unit configured to create, in the field, the usage object that is being temporarily displayed, from the material object possessed by the user character, based on an operation of the user.

BRIEF DESCRIPTION OF THE DRAWINGS

FIG. 4 is a diagram illustrating the configuration example of a user character DB;

FIG. 5 is a diagram illustrating the configuration example of a usage object information DB;

FIG. 6 is a diagram illustrating the configuration example of a material DB;

FIG. 7 is a diagram illustrating the configuration example of a usage object creation possible position DB;

FIG. 13 is a diagram illustrating the configuration example of a user character DB;

FIG. 14 is a diagram illustrating the configuration example of a link usage object information DB;

FIG. 19 is a diagram illustrating the configuration example of a learning condition information DB;

FIG. 24 is a diagram illustrating an example of collision priority when arranging a usage object and a link usage object; and FIGS. 25A to 25D are diagrams illustrating examples of arrangement shape information.

DESCRIPTION OF THE EMBODIMENTS

An embodiment for implementing the present disclosure is described below with reference to the drawings.

First Embodiment

<System Configuration>

Figure 1A:
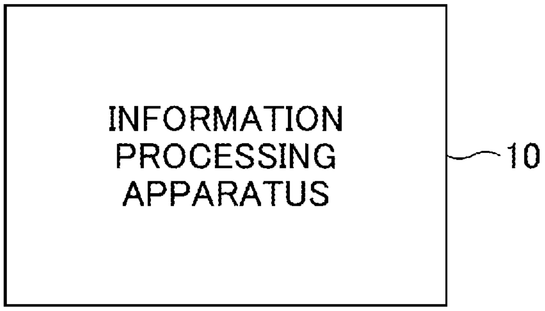
FIGS. 1A and 1B are configuration diagrams of examples of a game system according to a first embodiment.
Figure 1B:
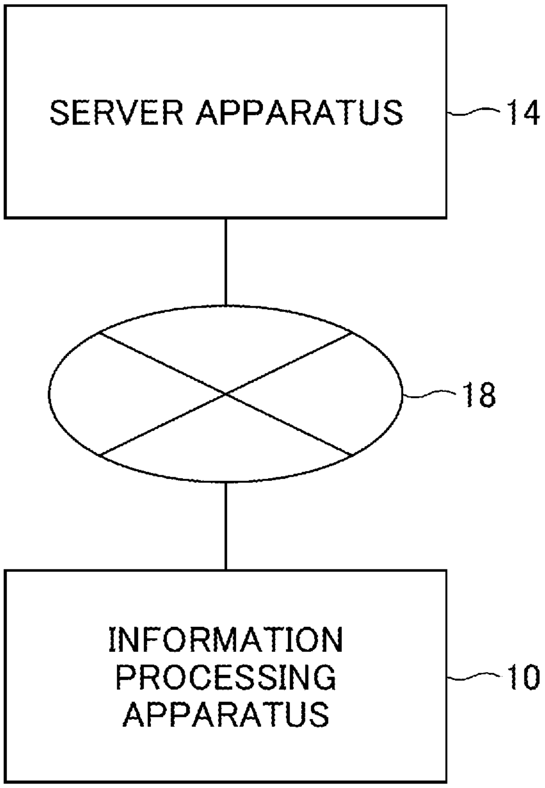

First, the system configuration in the first embodiment will be described with reference to FIGS. 1A and 1B. FIGS. 1A and 1B are configuration diagrams of an example of a game system according to the first embodiment. The game system according to the first embodiment includes an information processing apparatus 10 illustrated in FIG. 1A or an information processing system illustrated in FIG. 1B.

The information processing apparatus 10 in FIG. 1A is a computer operated by a user. The information processing apparatus 10 illustrated in FIG. 1A receives an operation from a user by means of a touch panel, a controller, a keyboard, a mouse, etc., executes information processing according to the operation, and displays the execution result.

Further, the information processing system illustrated in FIG. 1B has a configuration in which the information processing apparatus 10 and a server apparatus 14 are connected in a communicable manner via a network 18. The information processing apparatus 10 in FIG. 1B is a computer similar to that in FIG. 1A. The server apparatus 14 in FIG. 1B is implemented by a computer similar to that in FIG. 1A.

By transmitting and receiving data to and from the information processing apparatus 10, the server apparatus 14 executes information processing according to the user's operation received by the information processing apparatus 10 and provides the execution result to the information processing apparatus 10. The information processing apparatus 10 displays the execution result provided by the server apparatus 14.

The server apparatus 14 may be implemented by a cloud computer. The number of the server apparatuses 14 illustrated in FIG. 1B is not limited to one, but two or more may be distributed. The server apparatus 14 may be used for performing download processing such as downloading a program (application) to the information processing apparatus 10, login processing of a user, processing for managing various databases, or the like. The system configuration illustrated in FIG. 1 is an example.

[Hardware Configuration]

Figure 2:
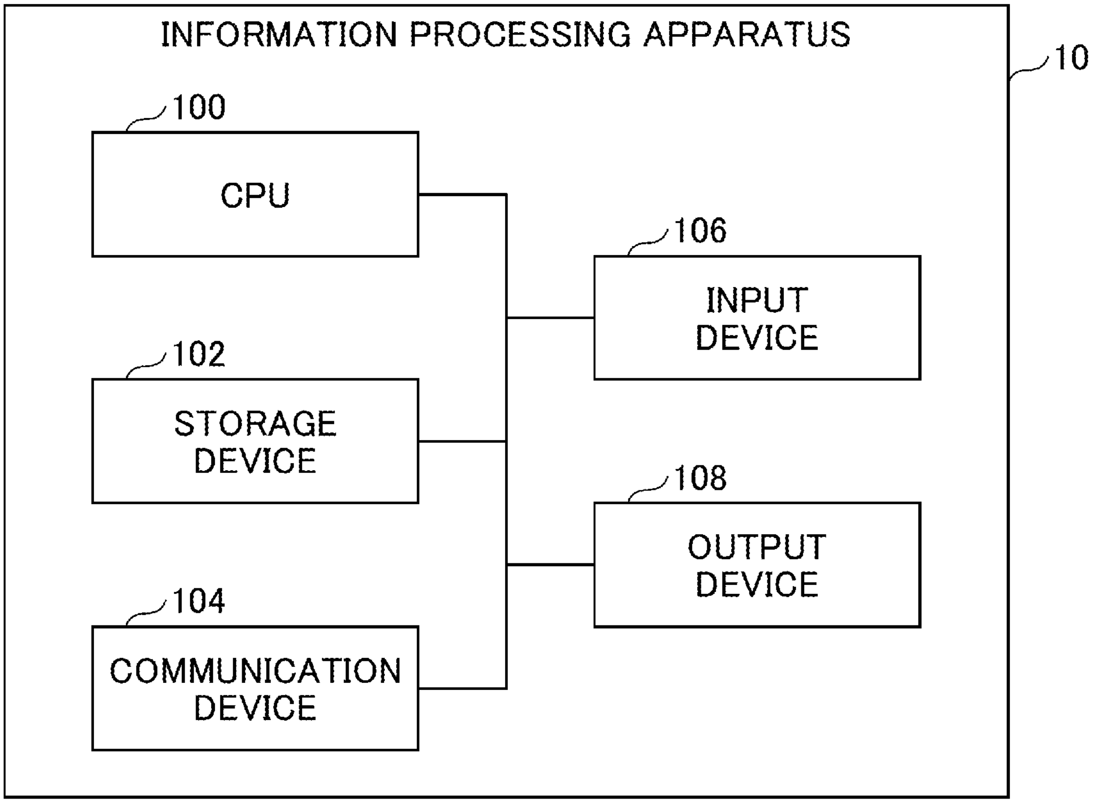
FIG. 2 is a diagram illustrating an example of the hardware configuration of an information processing apparatus according to the first embodiment.

The information processing apparatus 10 according to the first embodiment is configured, for example, as illustrated in FIG. 2. The configuration of the server apparatus 14 is the same as that of the information processing apparatus 10, and, therefore, a description thereof is omitted. FIG. 2 is a diagram illustrating an example of the hardware configuration of the information processing apparatus according to the first embodiment.

The information processing apparatus 10 in FIG. 2 includes, for example, a CPU (Central Processing Unit) 100, a storage device 102, a communication device 104, an input device 106, and an output device 108. The CPU 100 controls the information processing apparatus 10 according to a program. The storage device 102 is, for example, memory such as a ROM (Read Only Memory) or a RAM (Random Access Memory), or storage such as a HDD (Hard Disk Drive) or an SSD (Solid State Drive). The storage device 102 stores programs and data to be executed by the CPU 100.

The communication device 104 is a communication device such as a network circuit that controls communication. The input device 106 is an input device such as a touchpad, a controller, a mouse, a keyboard, a camera, a microphone, and the like. The output device 108 is an output device such as a display or a speaker. The touch panel is implemented by combining a touch pad, which is an example of the input device 106, and a display, which is an example of the output device 108. The hardware configuration in FIG. 2 is an example.

[Functional Blocks]

In the following, an example of a functional configuration in which the information processing apparatus 10 receives an operation for a game being executed from a user such as a player, generates and displays an image of the game in response to the operation, and causes the user to play the game, is described. The functional configuration illustrated in FIG. 3 is an example, and for example, at least part of the functional configuration illustrated in FIG. 3 may be provided in the server apparatus 14 so that the information processing apparatus 10 and the server apparatus 14 cooperate with each other to perform processing.

Figure 3:
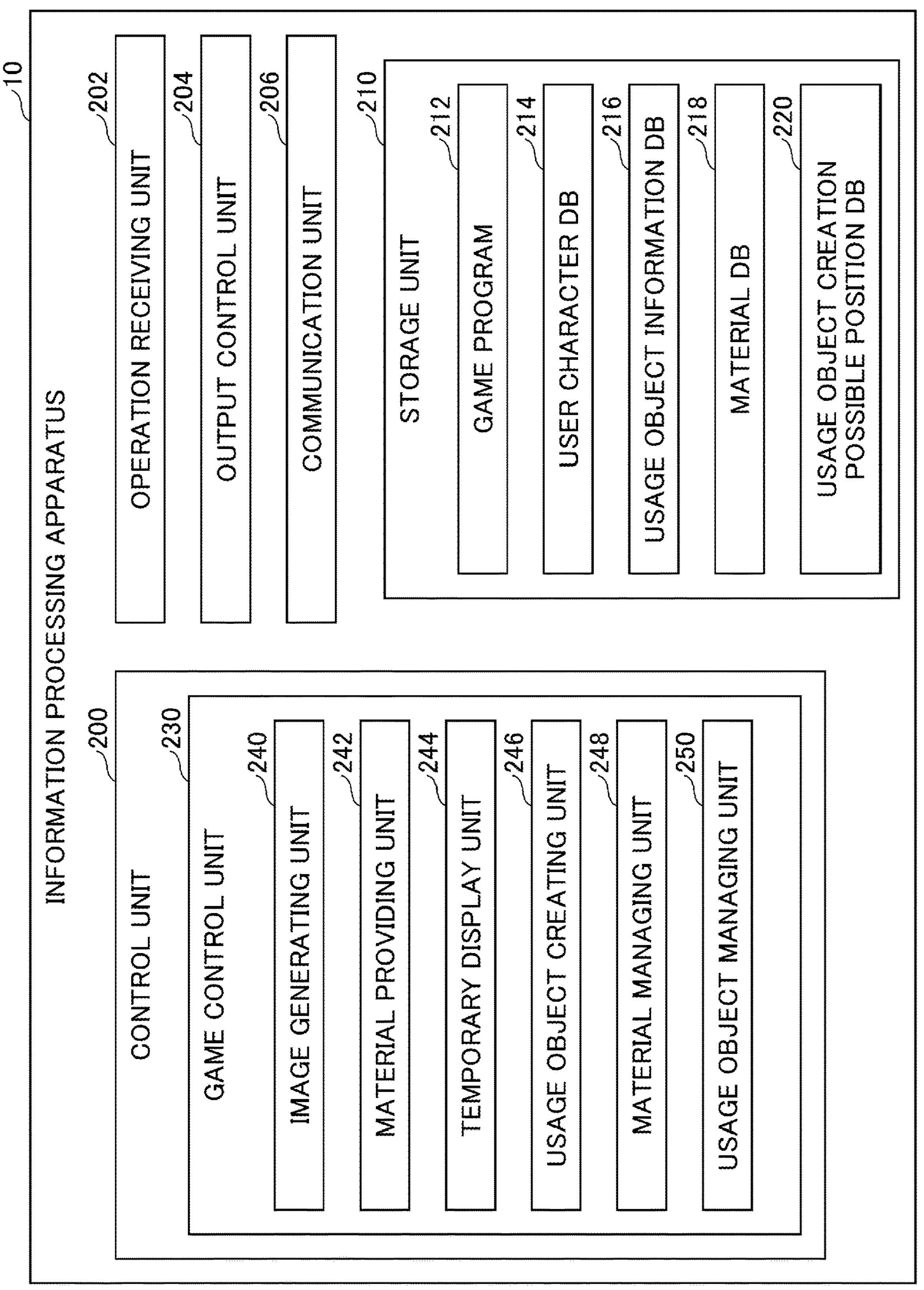
FIG. 3 is a diagram illustrating an example of a functional configuration of the information processing apparatus according to the first embodiment.

FIG. 3 is a diagram illustrating an example of the functional configuration of the information processing apparatus according to the first embodiment. The information processing apparatus 10 in FIG. 3 includes a control unit 200, an operation receiving unit 202, an output control unit 204, a communication unit 206, and a storage unit 210.

The storage unit 210 in FIG. 3 stores a game program 212, a user character DB 214, a usage object information DB 216, a material DB 218, and a usage object creation possible position DB 220. The storage unit 210 may be implemented by a storage device 102 or by a storage device connected via a network 18 or the like.

The game program 212 is an example of a game processing program executed by the CPU 100. The user character DB 214 stores information about user characters displayed in game images. The usage object information DB 216 stores information about usage objects that can be created by user characters from materials in a game.

The material DB 218 stores information about material objects needed to create usage objects in the game. Further, the usage object creation possible position DB 220 stores information about the position where the user character can create a usage object from a material object in a game.

The control unit 200 controls the entire information processing apparatus 10. The overall control of the information processing apparatus 10 includes the control of receiving an operation from the user on the game being executed and generating and displaying an image of the game in response to the operation.

The control unit 200 is implemented by the CPU 100 executing the processing described in a program such as the game program 212. The control unit 200 in FIG. 3 includes a game control unit 230. The game control unit 230 has a configuration including an image generating unit 240, a material providing unit 242, a temporary display unit 244, a usage object creating unit 246, a material managing unit 248, and a usage object managing unit 250.

The game control unit 230 performs overall control related to a game. Based on the user's operation, the game control unit 230 executes game processing of a game in which the user character takes action in the field of a virtual space.

The image generating unit 240 generates an image of the game according to the game processing being executed by the game control unit 230, and causes the output device 108 to display the image as a screen of the game. The material providing unit 242 controls the providing of a material object to the user character according to the game processing being executed by the game control unit 230. The material providing unit 242 provides, for example, a material object corresponding to the position of the user character in the field, to the user character.

The temporary display unit 244 temporarily displays the usage objects that can be created by the user character according to the game processing being executed by the game control unit 230. The temporary display unit 244 temporarily displays the usage objects that can be created by the user character according to the position of the user character in the field, for example. The temporary display would suffice, for example, to be a display to indicate to the user that a usage object can be created, and the temporary display does not need to be a display to indicate the accurate position in the field where the usage object is to be arranged. The temporary display is a display for causing the user to notice the approximate position in the field at which a usage object is to be created, for example.

The usage object creating unit 246 creates, in the field, a usage object that is temporarily displayed, based on the user's operation to instruct the creation of a usage object. The usage object created in the field can be used for the moving or the battling of the user character in the field operated by the user. For example, a user character can use a usage object as a scaffold for reaching a position that the user has not been able to reach. That is, the usage object creating unit 246 creates a usage object that the user character uses as a scaffold and that enables the user character to reach a position that has not been reached. Further, by using the usage object for an attack, the user character may change the action at the time of attack or change parameters such as the attack force by the combination of the usage object and the weapon type. That is, the usage object creating unit 246 creates a usage object that changes the action of the user character at the time of attack or changes the parameters at the time of attack. Further, the usage object may change (influence) the action of the user character. That is, the usage object creating unit 246 creates a usage object that causes a change (influences) to the action of the user character. Also, a usage object created in a field may be a temporary object that disappears after a certain period of time elapses. That is, the usage object creating unit 246 creates a usage object that disappears after a certain time elapses.

The usage object creating unit 246 consumes the material object to generate a usage object. The usage object creating unit 246 may create a usage object by consuming different material objects according to the type of usage object to be created. The time taken to complete the creation of a usage object may vary depending on the type of usage object to be created, or may be the same. The material object consumed by the generation of the usage object may be recovered by acquiring from the field, by dropped items from the enemy, or by destroying the usage object, or the material object may be recovered by a predetermined amount every time a time elapses.

The material managing unit 248 manages information about material objects that the user character can acquire from the field. The material object may be acquired directly by the user character, such as from a field, or may be acquired indirectly by the user character by some action with respect to an object present in the field. For example, some action on an object in a field by a user character may be to cut down a tree, cut out a stone, etc.

Further, a material object may be acquired as a dropped item when an enemy is defeated or a body part is destroyed successfully. A material object may be acquired by destroying a usage object. The acquisition of a material object by destroying the usage object may be automatically done regardless of the distance between the user character and the material object.

The usage object managing unit 250 manages information related to the position where a user character can create a usage object. Positions where the user character can create a usage object include, for example, the position where the user character is to (or needs to) create a usage object for solving a puzzle in the game, etc. The position where the user character can create the usage object includes the position where the usage object is to be created in order to advance a story or a quest, etc.

The usage object managing unit 250 does not need to manage the position where the usage object is to be created as an accurate position considering the arrangement in the field, but it would suffice to only manage the position so that the user can notice the approximate position in the field where the usage object is to be created, for example. For example, the approximate position in the field where the user character is to create a usage object is the position where the usage object needs to be created, etc., for the user character to move to a location to acquire an item needed to solve a quest or a location for advancing the quest.

The operation receiving unit 202 receives various operations of the user on the input device 106. The output control unit 204 displays various screens on the output device 108 under the control of the control unit 200. The operation receiving unit 202 is implemented by the CPU 100 controlling the input device 106 according to a program. The output control unit 204 is implemented by the CPU 100 controlling the output device 108 according to a program. The user's various operations on the input device 106 refer to operations in which the user operates the operation receiving unit 202 to cause the CPU 100 to execute processing. The output control unit 204 displays various screens and outputs sound according to the control of the control unit 200.

The communication unit 206 communicates via the network 18 or the like. The communication unit 206 is implemented by the CPU 100 executing a program and controlling the communication device 104 according to the program.

[Data Configuration]

Here, the data configurations of the user character DB 214, the usage object information DB 216, the material DB 218, and the usage object creation possible position DB 220 are described with reference to FIGS. 4 to 7. The data configurations in FIGS. 4 to 7 illustrate items necessary for the explanation of the first embodiment, and other items are omitted as appropriate.

FIG. 4 is a configuration diagram of an example of a user character DB. The user character DB 214 in FIG. 4 stores information about the user character operated by the user. The information about the user character illustrated in FIG. 4 includes the information illustrated in FIG. 4 (A) to (C).

FIG. 4(A) is an example of position information indicating the position of the user character in the field. FIG. 4(B) is an example of possessed material information indicating the material object possessed by the user character. FIG. 4(C) is a diagram illustrating an example of created usage object information in which the position information indicating the position where the user character has created the usage object is associated with a created usage object ID indicating the usage object created in the corresponding position information.

With the user character DB 214 illustrated in FIG. 4, the game control unit 230 manages the 2C position in the field of the user character operated by the user, the material object possessed by the user character, and information on the usage object created by the user character.

FIG. 5 is a configuration diagram illustrating an example of the usage object information DB. The usage object information DB 216 in FIG. 5 stores the usage object ID, necessary material information, shape information, and image data in association with each other, as information about the usage object that can be created by the user character from the material in the game.

A usage object ID is an example of identification information of a usage object. Necessary material information is an example of information indicating a material object needed to create a usage object. Shape information is an example of information indicating the shape of a usage object. Image data is an example of data for displaying a usage object. The usage object information DB 216 in FIG. 5 may include information indicating the effect of the usage object affecting the action of the user character. For example, the effect of a usage object that affects the action of a user character is a change in the action at the time of attack, or a change in parameters such as the attack force, according to the combination of the usage object and the weapon type.

With the usage object information DB 216 illustrated in FIG. 5, the game control unit 230 manages the information of the usage object created by the user character.

FIG. 6 is a configuration diagram of an example of a material DB. The material DB 218 in FIG. 6 stores information about the material object in the field. Information about the material object in the field includes position information, material object information, and image data stored in association with each other as illustrated in FIG. 6. Position information is an example of position information indicating the position of a material object in a field. Material object information is an example of information indicating the type and number of material objects in the position indicated by the position information. Image data is an example of data for displaying material objects.

With the material DB 218 illustrated in FIG. 6, the game control unit 230 manages the information of the material object that the user character acquires from the field.

FIG. 7 is a configuration diagram illustrating an example of the usage object DB. The usage object creation possible position DB 220 in FIG. 7 stores information about the position where the user character can create a usage object. The information about the position where the user character can create the usage object includes the usage object ID and the creation possible position stored in association with each other as illustrated in FIG. 7.

A usage object ID is an example of identification information for a usage object. Creation possible position is an example of position information in a field where a user character can create a usage object. The creation possible position includes, for example, position information in a field where a user character is to create a usage object.

With the usage object creation possible position DB 220 in FIG. 7, the game control unit 230 manages the position in the field where the user character can create the usage object.

[Processing]

Figure 8:
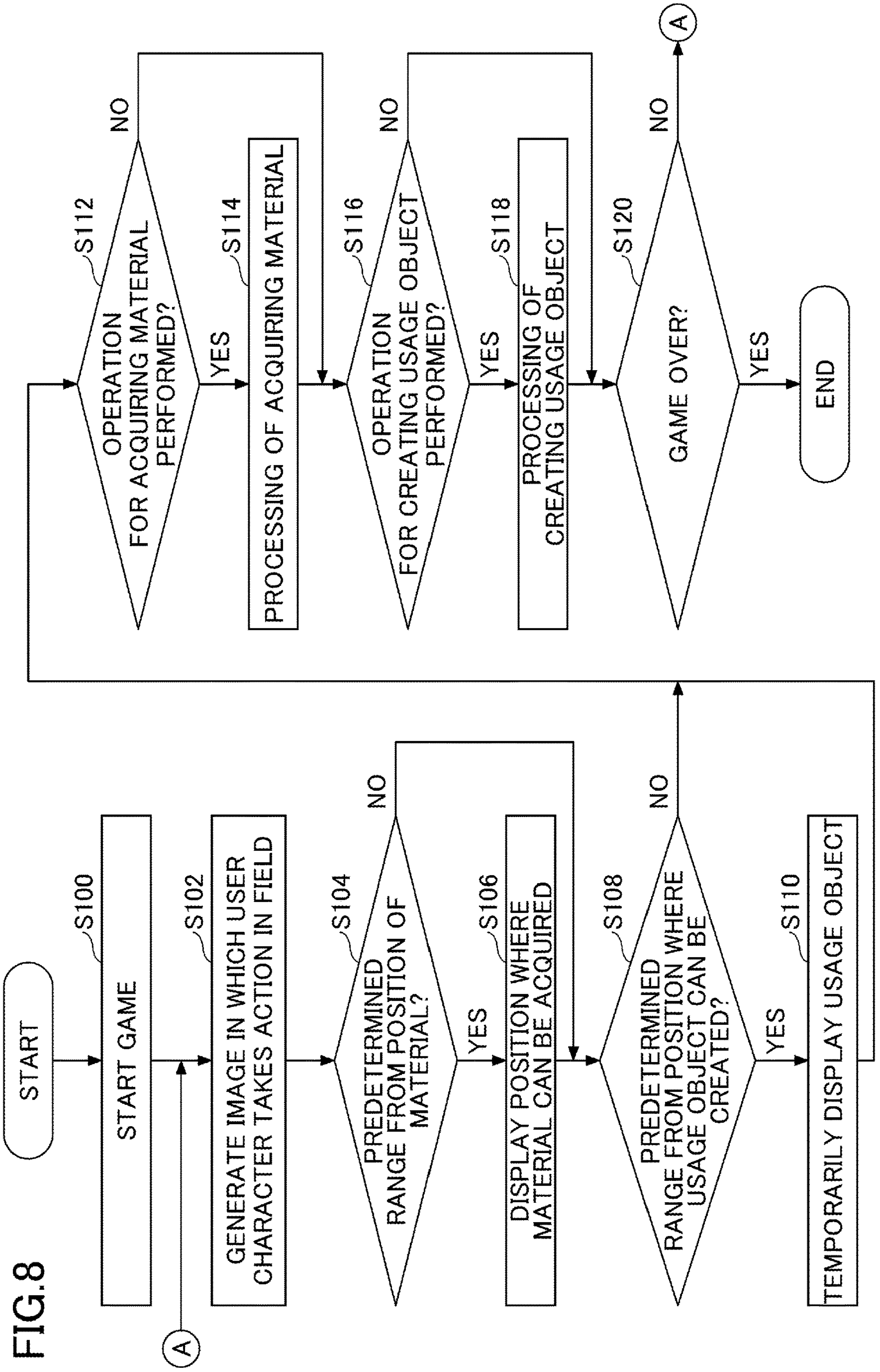
FIG. 8 is a flowchart of one example of processing of a game system according to the first embodiment.
Figure 9:
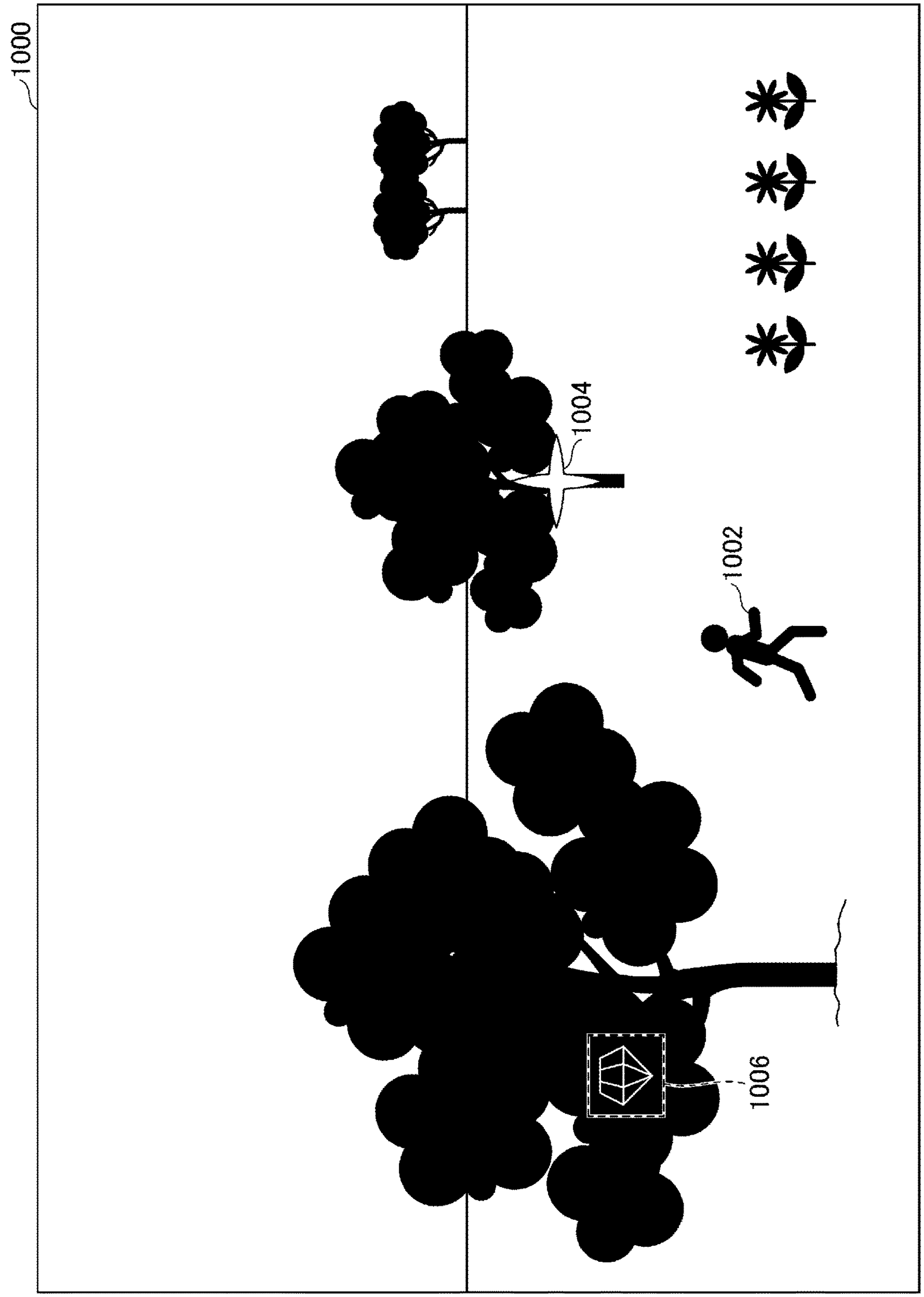
FIG. 9 is an image diagram of an example of an image of a user character taking action in a field.
Figure 10:
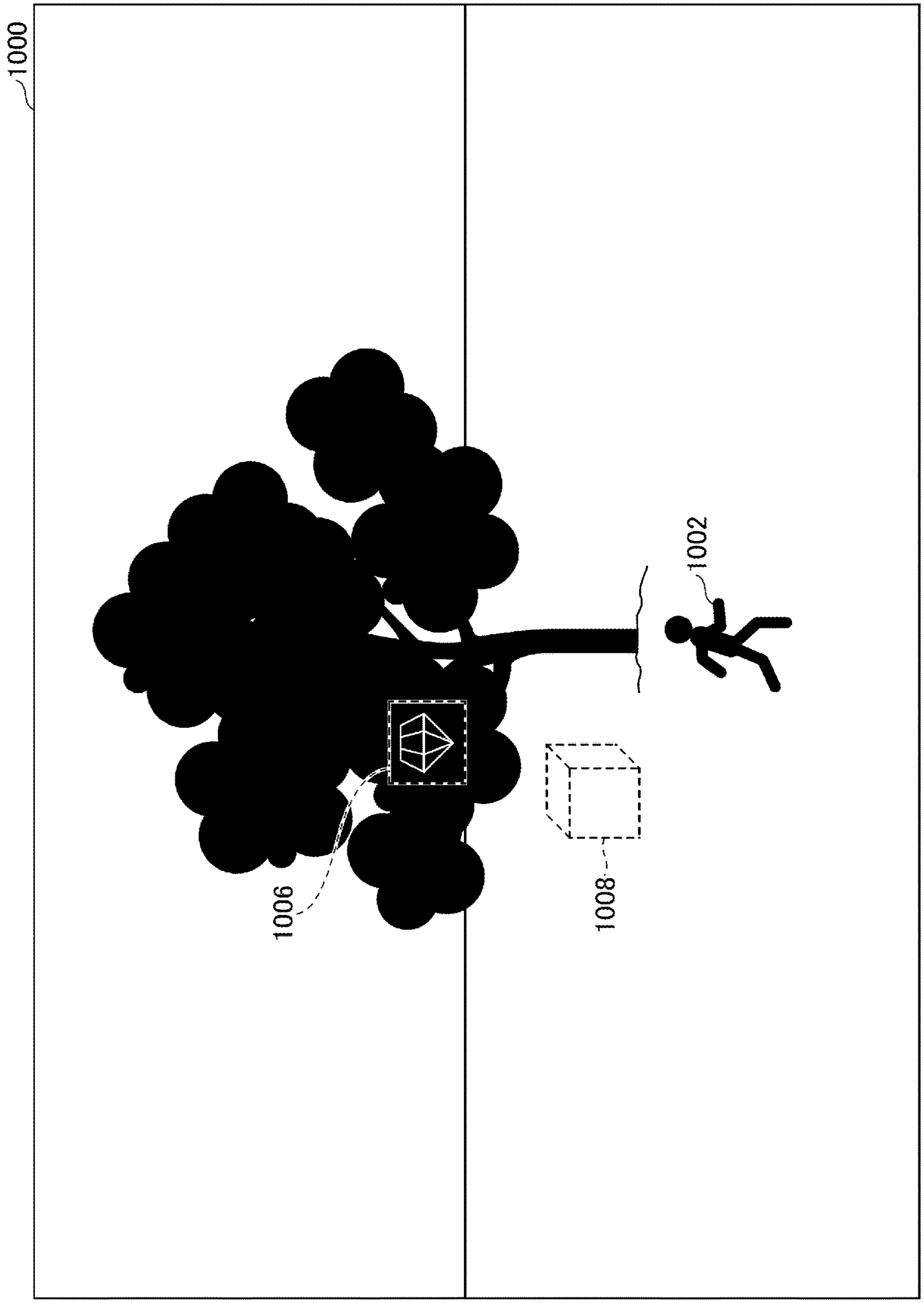
FIG. 10 is an image diagram of an example of an image of a user character taking action in a field.
Figure 11:
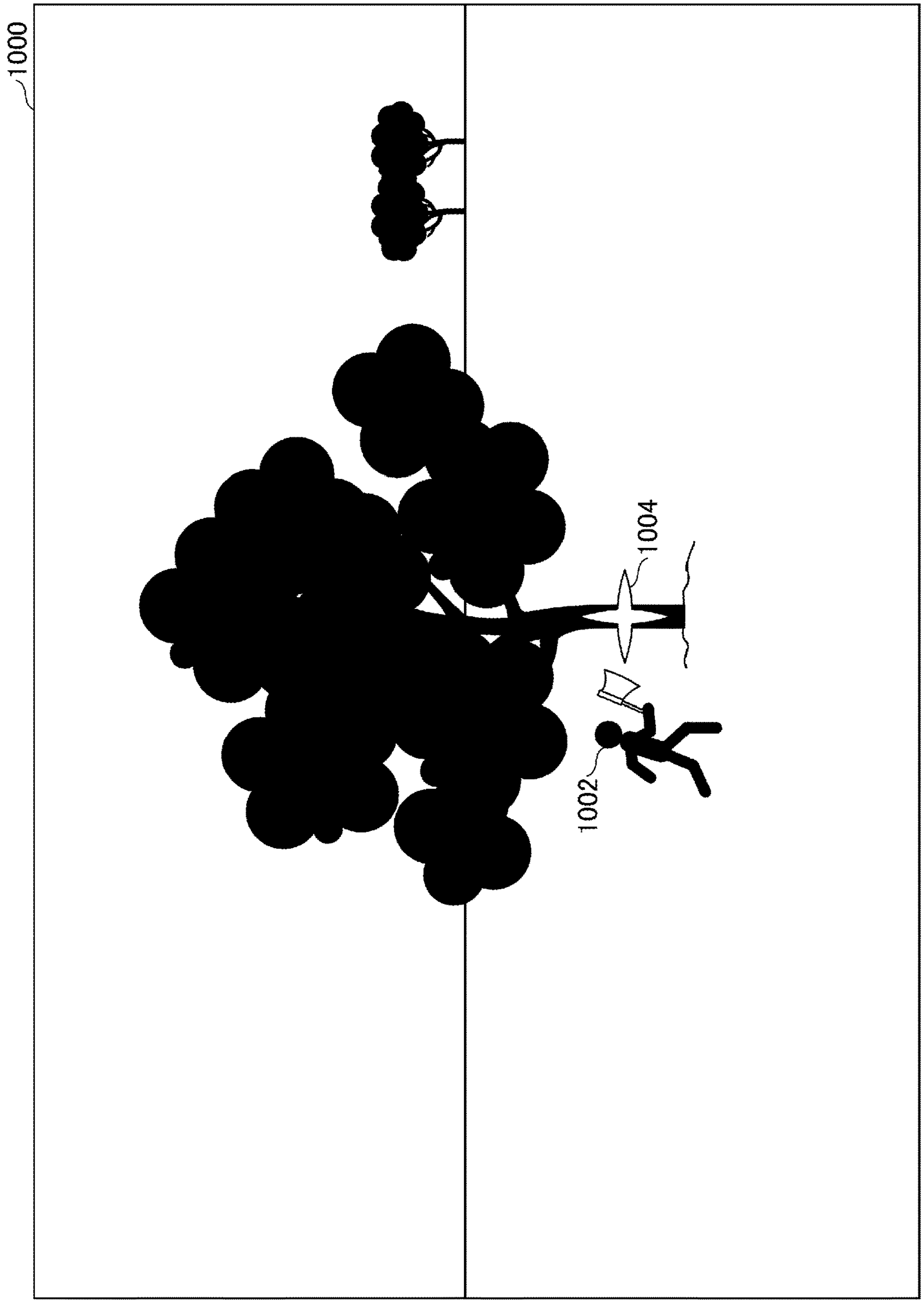
FIG. 11 is an image diagram of an example of an image of a user character taking action in a field.

An example of processing in which the game system according to the first embodiment receives an operation for a game from a user, generates an image of the game according to the operation, and displays (outputs) the image on the output device 108 is described below. FIG. 8 is a flowchart of one example of the processing of the game system according to the first embodiment. FIGS. 9 to 11 illustrate an example of an image of a user character taking action in a field. An image 1000 of FIGS. 9 to 11 indicates an example of a game screen in which a user character 1002 takes action in the field. The user character 1002 takes action in the field and collects the necessary material objects, which enables the creation of usage objects. The information processing apparatus 10 executes game processing of the game in which the user character 1002 takes action in the field based on the user's operation.

In step S100, the game control unit 230 of the information processing apparatus 10 starts game processing of the game in which the user character 1002 takes action in the game. In step S102, the image generating unit 240 generates an image in which the user character 1002 takes action in the field based on the user's operation and causes the output device 108 to display the image. The user character 1002 can create a usage object by taking action in the field illustrated in, for example, FIGS. 9 to 11 and collecting the necessary material objects.

In step S104, the material providing unit 242 refers to the position information of the user character 1002 in FIG. 4(A), and the position information indicating the position of the material object in the field in the material DB 218 in FIG. 6, and determines whether the user character 1002 is within a predetermined range from the position of the material object.

When the user character 1002 is within a predetermined range from the position of the material object, the material providing unit 242 performs the processing of step S106. When the user character 1002 is not within the predetermined range from the position of the material object, the material providing unit 242 skips the processing of step S106.

In step S106, the material providing unit 242 displays the position of the material object that is within a predetermined range from the position of the user character 1002 in the field, for example, as a light 1004 in FIG. 9. Therefore, the user can notice the position of the material object that is within a predetermined range from the user character 1002, by moving the user character 1002 in the field. Note that the light 1004 is only an example and may be any display to make the user notice the position of the material object.

In step S108, the temporary display unit 244 refers to the position information of the user character 1002 in FIG. 4(A) and the creation possible position in the usage object creation possible position DB 220 in FIG. 7, and determines whether the user character 1002 is within a predetermined range from the creation possible position of the usage object. When the user character 1002 is within a predetermined range from the position where the usage object can be created, the temporary display unit 244 performs the processing of step S110. When the user character 1002 is not within the predetermined range from the position where the usage object can be created, the temporary display unit 244 skips the processing of step S110.

In step S110, the temporary display unit 244 temporarily displays the creation possible position of the usage object that is within a predetermined range from the position of the user character 1002 in the field, for example, as a temporary object 1008 in FIG. 10. Therefore, by moving the user character 1002 in the field, the user can notice the creation possible position of the usage object that is within a predetermined range from the user character 1002. The display of the temporary object 1008 may be changed depending on whether the user character 1002 is possessing all of the material objects necessary for creating the usage object.

In the example of the game screen illustrated in FIG. 10, by creating a usage object at the position of the temporary object 1008, the user character 1002 climbs onto the usage object and reaches an item 1006 at a high position. By confirming the position where the temporary object 1008 is temporarily displayed, the user can easily notice that there is some kind of gimmick at that position.

In step S112, the material providing unit 242 determines whether an operation to acquire the material object is received from the user in a state where, for example, the user character 1002 approaches the light 1004 that displays the position of the material object illustrated in FIG. 11. Upon receiving an operation to acquire a material object from the user, the material providing unit 242 performs the processing of step S114. When an operation to acquire the material object is not received from the user, the material providing unit 242 skips the processing of step S114.

In step S114, the material providing unit 242 performs processing of acquiring the material object for providing the material object to the user character 1002 based on the operation of acquiring the material object from the user. For example, in FIG. 11, the user character 1002 acquires a material object such as a plate material, by cutting down the tree indicated by the light 1004 with an axe, for example. Note that the user character 1002 may simply acquire the material object arranged at a location indicated by the light 1004 without performing actions such as cutting down a tree with an axe.

In step S116, the usage object creating unit 246 determines whether an operation to create a usage object is received from the user, for example, in a state where the user character 1002 is temporarily displaying the temporary object 1008 illustrated in FIG. 10. When an operation to create a usage object is received from the user, the usage object creating unit 246 performs the processing of step S118. When an operation to create a usage object is not received from the user, the usage object creation unit 246 skips the processing in step S118.

In step S118, the usage object creating unit 246 performs creation processing for creating a usage object based on the operation for creating the usage object from the user. For example, in FIG. 10, the user character 1002 creates a usage object in a state of temporarily displaying the temporary object 1008, and uses the usage object as a foot stool to acquire the item 1006.

Moreover, when the user character 1002 uses the usage object for an attack, the action at the time of the attack or the parameters such as the attack force may be changed by the combination with the weapon type in the equipment. For example, if the usage object is a box and the weapon type is a sword, the action of the user character 1002 during an attack is an attack in which the user character 1002 jumps up from the box and swings down the sword widely. Further, parameters such as the attack force of the user character 1002 rise. Parameters such as attack force may be raised according to the number of stacked boxes that are the usage objects.

For example, if the usage object is a box and the weapon type is a hammer, the action of the user character 1002 during an attack is an attack in which the user character 1002 jumps up from the box while doing a forward somersault and slams the hammer to the ground. Parameters such as the attack force of the user character 1002 rise. Parameters such as the attack force may be increased by the number of rotations or the rotation speed of the forward somersaults exceeding a threshold.

For example, if the usage object is used for leaping and the weapon type is a bow, the action of the user character 1002 at the time of attack is an attack in which arrows are continuously shot while jumping backward. Parameters such as the avoidance rate of the user character 1002 rise. Further, for example, if the usage object is used for gliding from a high place and the weapon type is an artillery gun, the action of the user character 1002 in an attack is an attack in which an artillery gun is fired continuously while gliding from a high place. Parameters such as the avoidance rate of the user character 1002 rise.

There are various types of usage objects, such as those used as boxes, those used for leaping, those used as fire, those used for gliding from heights, those used as pickets, those used for connecting, and the like. Further, there are various types of usage objects, such as those used as vehicles, those used to block enemy attacks, those used to hide the line of sight of the enemy, those used as traps, those used for communication, those used at bases, homes, and other locations where activities of the user characters 1002 are based, and the like. Usage objects for communication are, for example, signboards or message boards. Usage objects at the base locations are, for example, wardrobes, hot springs, or ornaments. The usage object used as a hot spring may have a recovery effect on the user character.

Further, the user character 1002 may use the usage object for avoidance. For example, against an attack from an enemy that would damage the user character 1002 if the user character 1002 were in contact with the ground, the user character 1002 may avoid the attack by jumping up onto a usage object that is a box. Further, the user character 1002 may avoid an attack from an enemy that would damage the user character 1002 if the user character 1002 were in contact with the ground, by using a usage object used for flying. Further, the user character 1002 may avoid an attack from an enemy that would damage the user character 1002 if the user character 1002 were in contact with the ground, by jumping on a usage object that is a picket stuck in a cliff. Avoidance by using a usage object is not limited to avoiding an attack from an enemy, but may be used to avoid a device such as a stage gimmick that causes damage or a state abnormality to the user character 1002. The user character 1002 may use the usage object to prevent an attack or action of an enemy.

When usage objects are used upon stacking the usage objects, the function of the topmost usage object is used, and with respect to the usage objects other than the topmost usage object, a collision judgment function remains and other functions are stopped. For example, if a usage object that is a box is stacked on a usage object used for leaping, the usage object used for leaping is not used for leaping. Stacking used objects includes stacking used objects directly on top of each other as well as stacking used objects in a staggered manner.

In step S120, the game control unit 230 determines whether the game is over and repeats the processing of steps S102 to S120 until it is determined that the game is over. When it is determined that the game is over, the game control unit 230 ends the processing of the flowchart in FIG. 8.

In the first embodiment, the example in which the user character 1002 creates and uses the usage object is explained, but the enemy may create and use the usage object. Further, during the creation of a usage object, the user character 1002 may be prevented from being destroyed by enemy attacks. The created usage object may be given additional effects by actions such as magic by the user character 1002, or the use of items, or the providing of material objects, etc. The created usage object may also be strengthened by actions such as magic by the user character 1002, or the use of items, or the providing of material objects, etc.

Further, in the first embodiment, points may be awarded when the user character 1002 has involved the usage object in the play (has successfully used the usage object). In the first embodiment, according to the number of points accumulated, effects advantageous to the user may be given, such as strengthening the weapon or raising parameters such as attack force. Points may be accumulated for each type of usage object involved in the play, the type of weapon, or a combination of these.

A case where the user character 1002 has involved the usage object in the play (has successfully used the usage object) refers to a case where, for example, the combination of the usage object and the weapon type triggers a change of action at the time of attack. Further, the case where the user character 1002 has involved the usage object in the play refers to a case where, for example, the usage object has been used to avoid the attack of the enemy. The case where the user character 1002 has involved the usage object in the play refers to a case where, for example, the usage object is continuously created within a predetermined time.

Further, giving an effect advantageous to the user, such as strengthening a weapon or raising a parameter such as an attack force, according to the number of points accumulated, for example, refers to a case of raising the attack force of a weapon being equipped by the user character 1002 for a predetermined time. Further, giving an effect advantageous to the user, according to the number of points accumulated, for example, refers to giving an attribute according to the type of points accumulated. An attribute may be water, fire, or lightning. Further, giving an effect advantageous to the user according to the number of points accumulated, for example, refers to changing the form of a weapon equipped by the user character 1002. For example, if the usage object is a sword, the shape thereof changes so that the blade becomes longer and the range of attack is expanded. In the case of a sword, for example, the shape of the sword changes to add a thorn to the blade. Further, giving an effect advantageous to the user according to the number of points accumulated, for example, refers to increasing the appearance rate of rewards with high rarity.

Further, the usage object creating unit 246 may consider collision priority as illustrated in, for example, FIG. 24 when arranging the usage object. FIG. 24 is a diagram for explaining an example of collision priority when arranging a usage object and a link usage object. The link usage object will be described in the second embodiment.

FIG. 24 illustrates an example in which the other objects that come in contact are NPCs (Non Player Characters), large enemy characters, and small enemy characters. In the case of FIG. 24, the usage object creating unit 246 cannot arrange the usage object at the position where the usage object contacts the NPC. When a usage object is arranged at a position where the usage object comes in contact with a large enemy character, the usage object creating unit 246 destroys the usage object after a predetermined time has elapsed after setting the usage object. Further, when the usage object is arranged at a position where the usage object comes into contact with a small enemy character, the usage object creating unit 246 performs processing so that the small enemy character and the usage object push each other.

The behavior at the time of arrangement of the usage object thus created by the usage object creating unit 246 is made different depending on the type of the other object that comes into contact.

According to the first embodiment, compared to the case in which the temporary object 1008 is not temporarily displayed, it is possible to make the user easily notice the position in the field where the usage object is to be created from the material object. Therefore, according to the first embodiment, it is possible to reduce the possibility of the user becoming stuck in a quest or the like that cannot be solved without creating and using a usage object.

The shape of the temporary object 1008 illustrated in FIG. 10 may be the shape of the usage object to be created, or may simulate the shape of the usage object, or may not depend on the shape of the usage object.

Second Embodiment

For example, in a craft game, a user object created from a material object can be used to move a user character or to cause a user character to battle with an enemy character. Thus, if the user can create a new object from a usage object by an easy operation, the user can enjoy a variety of gameplay.

Therefore, the second embodiment aims at making it possible to create a link usage object from a usage object with simple operations. Note that the second embodiment is similar to the first with some exceptions, so the description will be omitted as appropriate. The system configuration and hardware configuration are the same as those in the first embodiment.

[Functional Blocks]

In the following, an example of a functional configuration in which the information processing apparatus 10 receives an operation for a game being executed from a user such as a player, and generates and displays an image of the game in response to the operation, thereby causing the user to play the game, is described. The functional configuration illustrated in FIG. 12 is an example, and for example, at least part of the functional configuration illustrated in FIG. 12 may be provided in the server apparatus 14 so that the information processing apparatus 10 and the server apparatus 14 cooperate with each other to perform processing.

Figure 12:
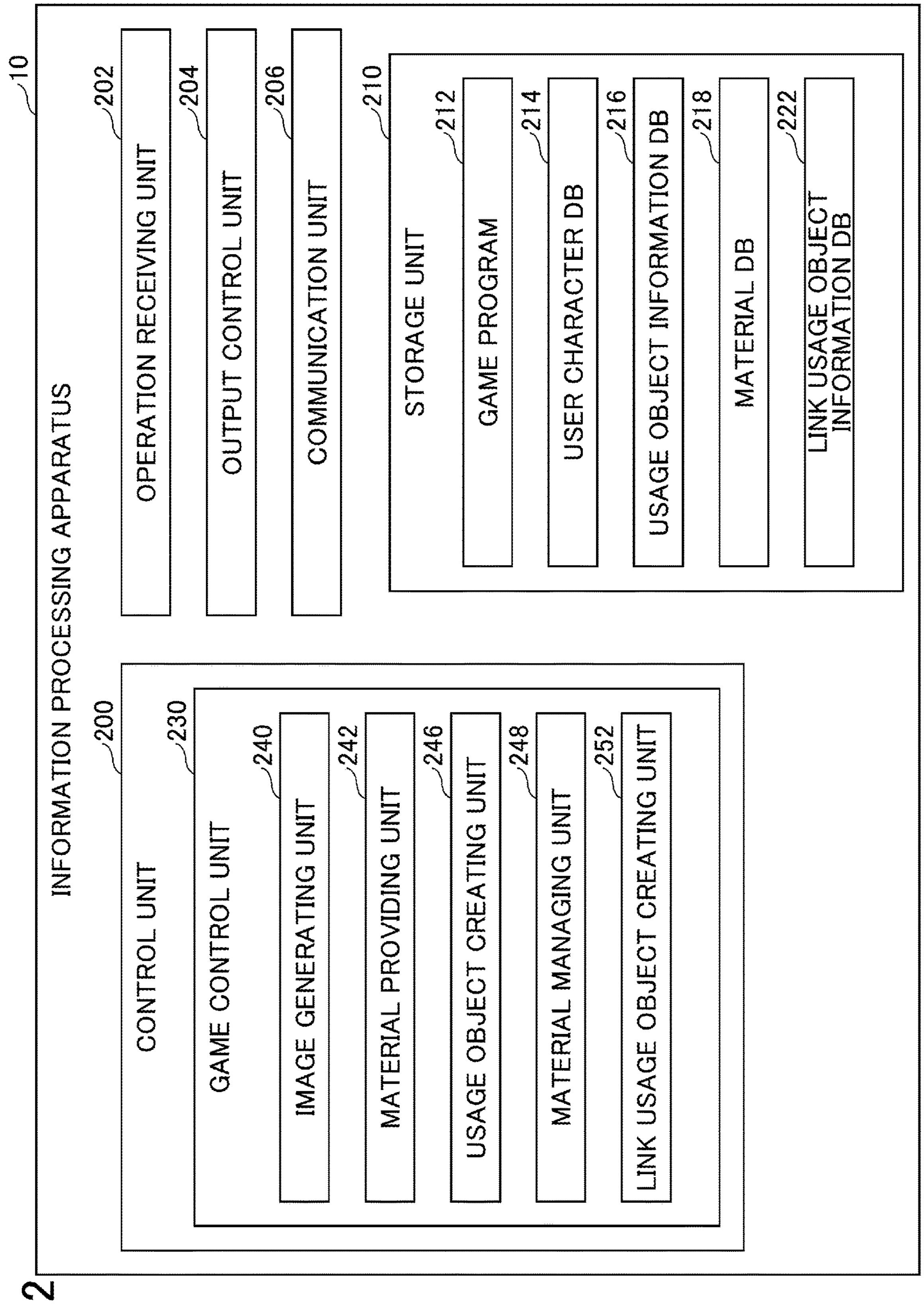
FIG. 12 is a diagram illustrating an example of a functional configuration of the information processing apparatus according to a second embodiment.

FIG. 12 is a diagram illustrating an example of the functional configuration of the information processing apparatus according to the second embodiment. The information processing apparatus 10 in FIG. 12 includes the control unit 200, the operation receiving unit 202, the output control unit 204, the communication unit 206, and the storage unit 210.

The storage unit 210 in FIG. 12 stores the game program 212, the user character DB 214, the usage object information DB 216, the material DB 218, and a link usage object information DB 222. The storage unit 210 may be implemented by the storage device 102 or by a storage device connected via the network 18 or the like.

The game program 212 is an example of a game processing program executed by the CPU 100. The user character DB 214 stores information about user characters displayed in game images. The usage object information DB 216 stores information about usage objects that can be created by user characters from materials in a game. The material DB 218 stores information about material objects needed to create in-game usage objects. The link usage object information DB 222 stores information about link usage objects that can be created by user characters from usage objects in a game.

The control unit 200 controls the entire information processing apparatus 10. The overall control of the information processing apparatus 10 includes the control of receiving an operation from the user on a game being executed and generating and displaying an image of the game in response to the operation.

The control unit 200 is implemented by the CPU 100 executing the processing described in a program such as the game program 212. The control unit 200 in FIG. 12 includes the game control unit 230. The game control unit 230 includes the image generating unit 240, the material providing unit 242, the usage object creating unit 246, the material managing unit 248, and a link usage object creating unit 252.

The game control unit 230 performs overall control related to a game. Based on the user's operation, the game control unit 230 executes game processing of a game in which the user character takes action in the field of a virtual space.

The image generating unit 240 generates an image of the game according to the game processing being executed by the game control unit 230, and causes the output device 108 to display the image as a screen of the game. The material providing unit 242 controls the providing of material objects to the user character according to the game processing being executed by the game control unit 230. The material providing unit 242 provides, to the user character, a material object corresponding to the position in the field of the user character, for example.

Based on the user's operation, the usage object creating unit 246 creates a usage object from the material object and arranges the usage object in the field. The usage object arranged in the field can be used for moving the user character or causing a user character to battle in the field. For example, a user character can use a usage object as a scaffold to reach a position that the user character has not been able to reach.

The material managing unit 248 manages information about material objects that can be acquired by a user character from the field. Further, the link usage object creating unit 252 creates a link usage object from the multiple usage objects based on the user's operation and arranges the link usage object in the field. The link usage object creating unit 252 creates a link usage object from the multiple usage objects based on the arrangement shape of the multiple usage objects, and arranges the created link usage object in a field.

For example, the link usage object creating unit 252 creates a link usage object that functions as a wall on the basis of usage objects, based on the arrangement shape of 2×3 usage objects that are linked in such a way that multiple usage objects are stacked. The link usage object creating unit 252 creates a link usage object that functions as a bridge on the basis of usage objects, based on the arrangement shape of 1×6 usage objects that are linked so as to connect the multiple usage objects.

For example, a link usage object that functions as a wall differs from multiple usage objects that are used as a basis in at least one of performance, appearance, and function. Performance includes wall strength, durability value, etc. The function is a wall, a bridge, a ladder, etc., that a link usage object provides to a user character. The appearance of a link usage object is preferably changed from multiple usage objects that are used as a basis in terms of the appearance, such as color, size, shape, texture, and the like, so that it can be perceived that multiple usage objects used as the basis have changed into a link usage object.

The types of usage objects described in the first embodiment are various objects, such as those used as boxes, those used for leaping, those used for fire, those used for gliding from heights, those used as pickets, and those used for connecting. The link usage object creating unit 252 may create a link usage object on the basis of usage objects, based on the arrangement shape of usage objects of the same type or the arrangement shape of multiple kinds of usage objects.

The operation receiving unit 202 receives various operations from the user on the input device 106. The output control unit 204 displays various screens on the output device 108 under the control of the control unit 200. The operation receiving unit 202 is implemented by the CPU 100 controlling the input device 106 according to a program. The output control unit 204 is implemented by the CPU 100 controlling the output device 108 according to a program. The user's various operations on the input device 106 refer to operations in which the user operates the operation receiving unit 202 to cause the CPU 100 to execute processing. The output control unit 204 displays various screens and outputs sound according to the control of the control unit 200.

The communication unit 206 communicates via the network 18 or the like. The communication unit 206 is implemented by the CPU 100 executing a program and controlling the communication device 104 according to the program.

[Data Configuration]

The data configurations of the user character DB 214 and the link usage object information DB 222 will be described with reference to FIGS. 13A to 14. The data configurations of the usage object information DB 216 and the material DB 218 are the same as those of the first embodiment, and, therefore, the explanation is omitted. Further, the data configurations in FIGS. 13A to 14 illustrate items necessary for the explanation of the second embodiment, and other items are omitted as appropriate.

FIG. 13 is a configuration diagram illustrating an example of the user character DB. The user character DB 214 in FIG. 13 stores information about the user character operated by the user. The information about the user character illustrated in FIG. 13 includes the information illustrated in FIG. 13 (A) to (D).

FIG. 13(A) is an example of position information indicating the position of the user character in the field. FIG. 13(B) is an example of the possessed material information indicating the material object possessed by the user character. FIG. 13(C) is a diagram illustrating an example of the created usage object information in which the position information indicating the position where the user character has created the usage object is associated with the created usage object ID indicating the usage object created at the position information. FIG. 13D is a diagram illustrating an example of the created link usage object information in which the position information indicating the position where the user character has created the link usage object is associated with the created link usage object ID indicating the link usage object created at the position information.

For example, with the user character DB 214 illustrated in FIG. 13, the game control unit 230 manages the position of the user character in the field operated by the user, the material object possessed by the user character, information on the usage object created by the user character, and information on the link usage object created by the user character.

FIG. 14 is a configuration diagram of an example of the link usage object information DB. The link usage object information DB 222 in FIG. 14 stores the link usage object ID, necessary usage object information, arrangement shape information, image data, and performance function in association with each other as information about the link usage object that can be created by the user character from the multiple usage objects in a game.

The link usage object ID is an example of identification information of a link usage object. Necessary usage object information is an example of information indicating a usage object required to create a link usage object. Image data is an example of data for displaying a link usage object. The arrangement shape information is an example of the information indicating the arrangement shape of the usage object required to create a link usage object. The performance function is an example of information indicating the performance and function of a link usage object.

As for the arrangement shape information, for example, as illustrated in FIGS. 25A to 25D, the arrangement shape of the usage object necessary for creating the link usage object is set. FIGS. 25A to 25D are diagrams illustrating examples of the arrangement shape information. In FIGS. 25A to 25D, the usage object used as a box is described as a box, the usage object used for leaping is described as leap, the usage object used as fire is described as fire, and the usage object used as a picket is described as a picket.

Figure 25A:
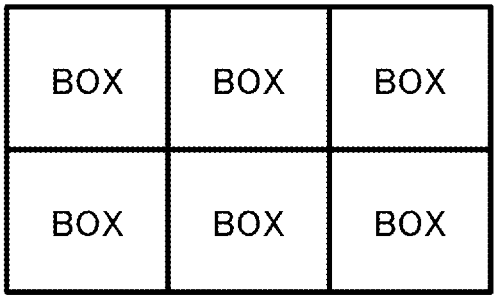
Figure 25B:
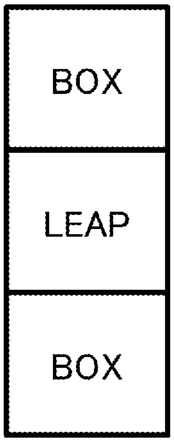

FIG. 25A illustrates an example of an arrangement shape formed by usage objects of the same type “box”, which is an arrangement shape for creating a wall that is a link usage object. FIGS. 25B to 25D illustrate examples of an arrangement shape formed by multiple kinds of used objects.

FIG. 25B illustrates an example of an arrangement shape formed by multiple types of usage objects “box” and “leap”, which is an arrangement 2C shape for creating a reflective wall that is a link usage object. FIG. 25C illustrates an example of an arrangement shape formed by the multiple types of usage objects “picket” and “leap”, which is an arrangement shape for creating a restraint machine which is a link usage object. FIG. 25D illustrates an example of an arrangement shape formed by usage objects of the same type “fire”, which is an arrangement shape for creating a flash firework that is a link usage object. A flash firework, which is a link usage object, has a dizzying and attacking effect, for example.

Note that the link usage objects are not limited to the above examples and may be chain traps, bombs, automatic slingshots, cannons, etc. Link usage objects cause new effects according to a combination of usage objects of the same kind or different usage objects. The type of link usage objects may be prepared as appropriate based on the content of the game, etc. Further, even in the case of an arrangement shape other than that for creating a link usage object, by linking and arranging multiple usage objects of the same kind in a connected manner, the effect may be enhanced.

With the link usage object information DB 222 in FIG. 14, the game control unit 230 manages the information of the link usage object created by the user character.

[Processing]

Figure 15:
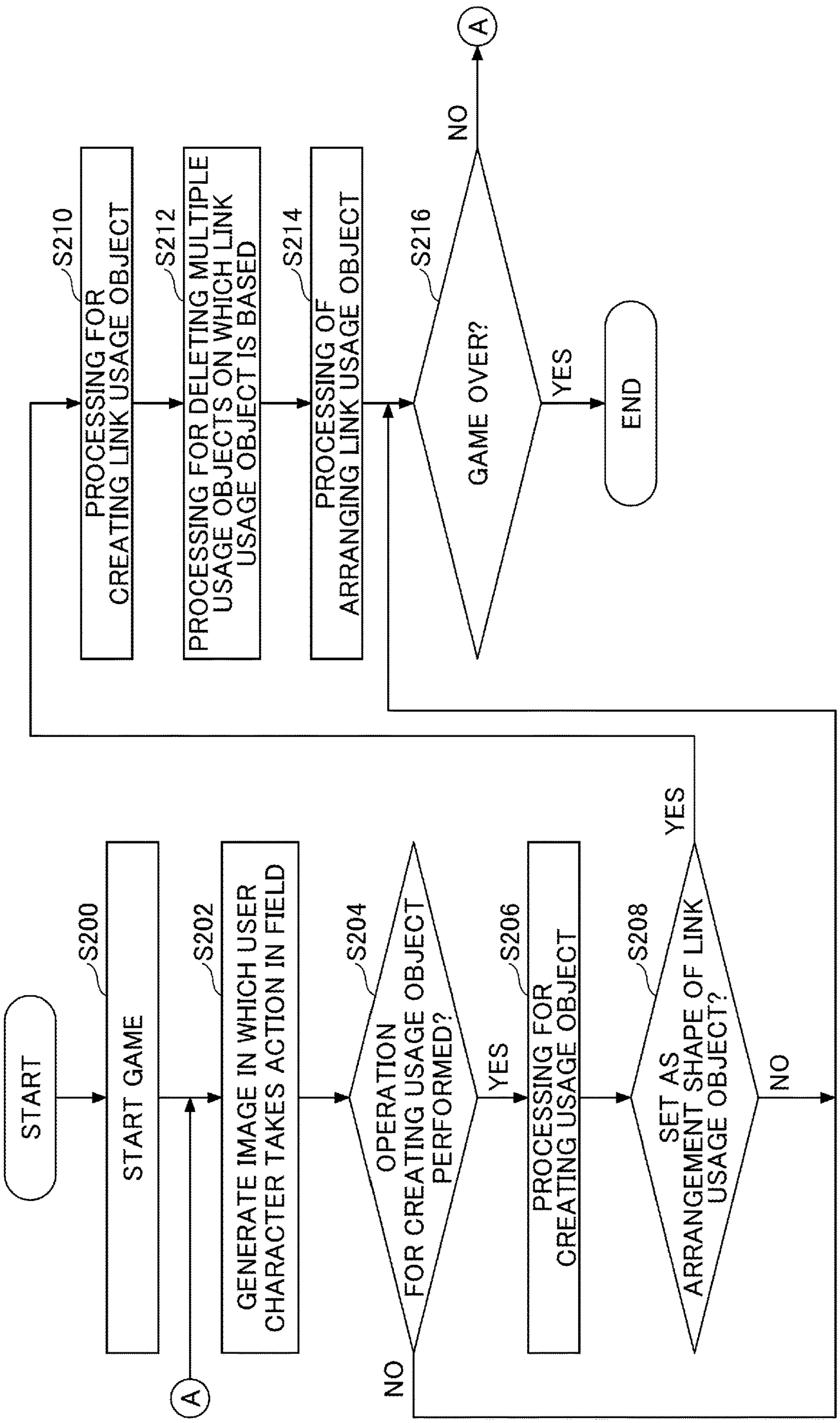
FIG. 15 is a flowchart of one example of processing of a game system according to the second embodiment.

An example of processing in which the game system according to the second embodiment receives an operation for a game from a user, generates an image of the game according to the operation, and displays (outputs) the image on the output device 108 is described below. FIG. 15 is a flowchart of one example of the processing of the game system according to the second embodiment.

Figure 16:
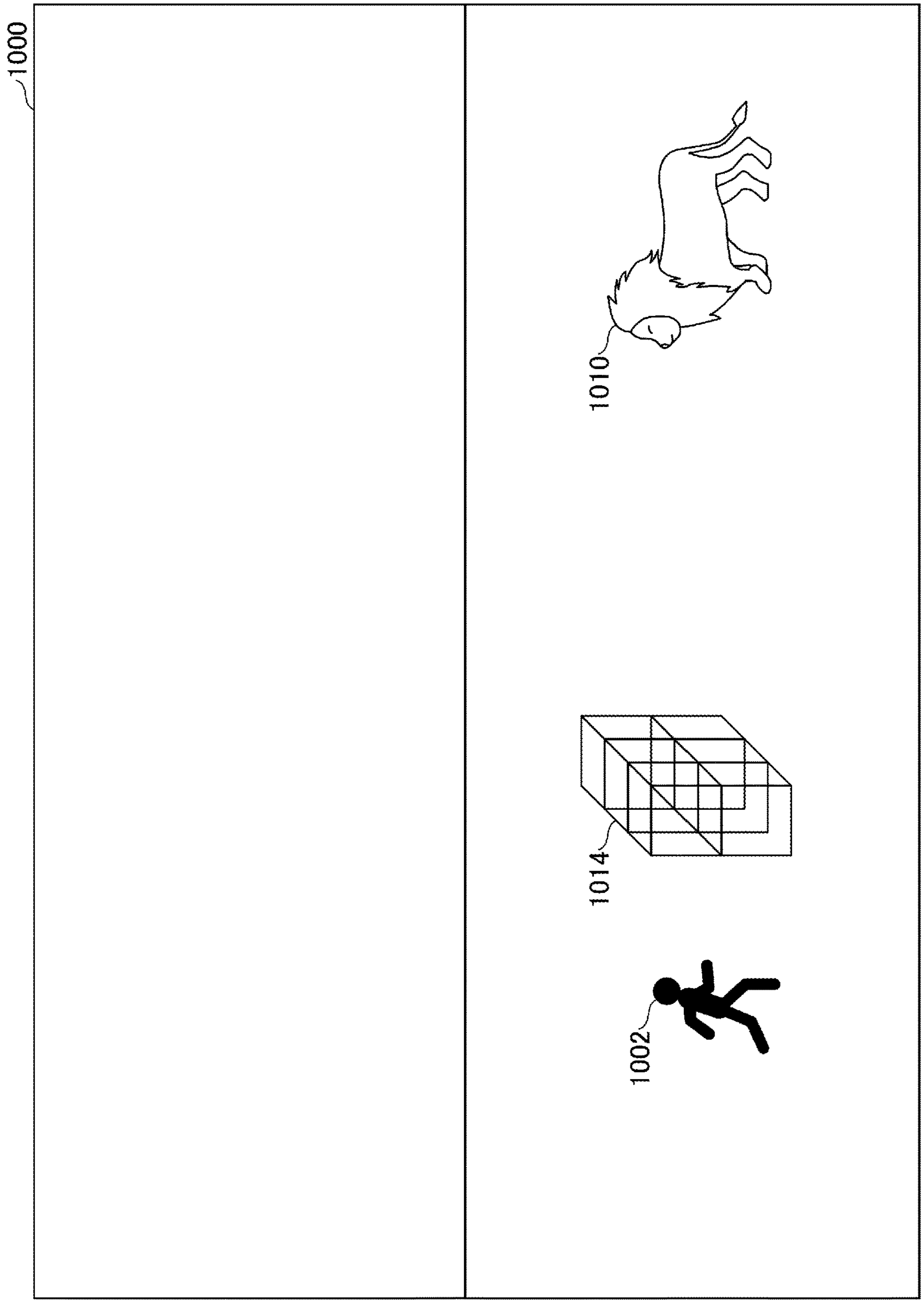
FIG. 16 is an image diagram of an example of an image of a user character taking action in a field.
Figure 17:
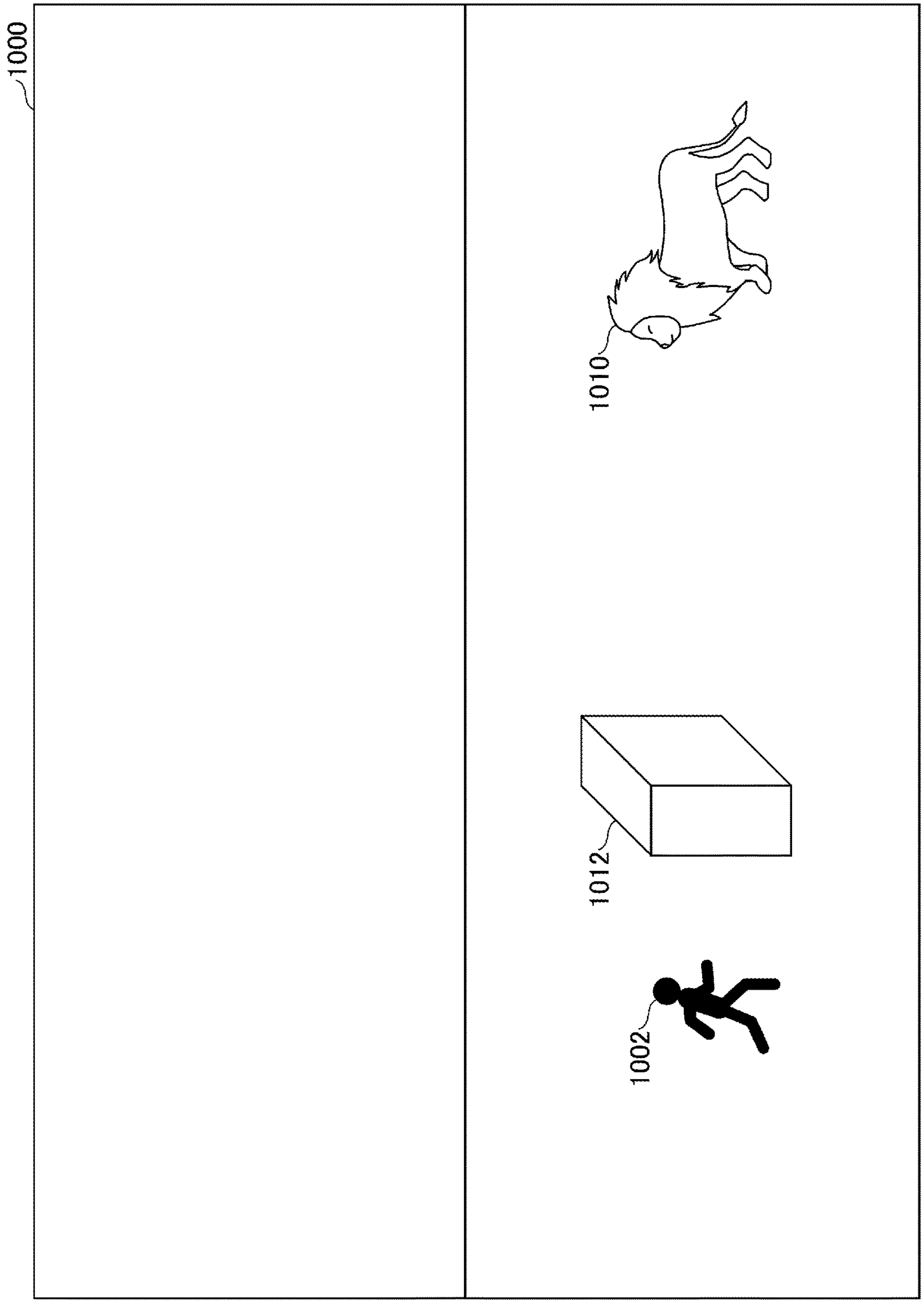
FIG. 17 is an image diagram of an example of an image of a user character taking action in a field.

FIGS. 16 to 17 are image diagrams of examples of images of a user character taking action in a field. An image 1000 of FIGS. 16 to 17 indicates an example of a game screen in which a user character 1002 takes action in the field. The user character 1002 takes action in the field and collects the necessary material objects, which enables the creation of usage objects.

Further, the user character 1002 can create a link usage object by arranging the created multiple usage objects in the field so as to have the arrangement shape of the link usage object. The information processing apparatus 10 executes game processing of the game in which the user character 1002 takes action in the field based on the user's operation.

In step S200, the game control unit 230 of the information processing apparatus 10 starts game processing of the game in which the user character 1002 takes action in the game. In step S202, the image generating unit 240 generates an image in which the user character 1002 takes action in the field based on the user's operation and causes the output device 108 to display the image. The user character 1002 takes action in the field, for example, illustrated in FIGS. 16 and 17, and by collecting the necessary material objects, it is possible to create a usage object.

In step S204, the usage object creating unit 246 determines whether an operation to create a usage object has been received from the user. When an operation to create a usage object is not received from the user, the usage object creating unit 246 skips the processing of steps S206 to S214. On the other hand, when an operation to create a usage object is received from the user, the usage object creating unit 246 performs the processing of step S206.

In step S206, the usage object creating unit 246 performs creation processing of a usage object for creating a usage object based on the operation for creating a usage object from the user. For example, it is assumed that the user character 1002 arranges the multiple usage objects 1014 in a field by linking the usage objects 1014 as illustrated in FIG. 16. The user may use the usage object 1014 arranged in the field. The usage objects 1014 arranged in the field are various objects, such as those arranged and left there by the user in the past, those arranged by other users, and those arranged by enemy characters. The user may use the usage object 1014 arranged in the field at any timing. The user may, for example, leave the usage object 1014 in a state of just before completion of the arrangement shape set as the arrangement shape information in the link usage object information DB 222 of FIG. 14, and complete the arrangement shape at an effective timing.

In step S208, the link usage object creating unit 252 determines whether the arrangement shape of the multiple usage objects 1014 arranged in the field in the processing of step S206, is set as arrangement shape information in the link usage object information DB 222 of FIG. 14, for example.

When the arrangement shape of the multiple usage objects 1014 arranged in the field in the processing of step S206 is not set as arrangement shape information in the link usage object information DB 222 of FIG. 14, for example, the link usage object creating unit 252 skips the processing of steps S210 to S214. On the other hand, when the arrangement shape of the multiple usage objects 1014 arranged in the field in the processing of step S206 is set as arrangement shape information in, for example, the link usage object information DB 222 of FIG. 14, the link usage object creation unit 252 performs the processing of step S210.

In step S210, the link usage object creating unit 252 performs creation processing of a link usage object for creating a link usage object based on the arrangement shape of the multiple usage objects 1014 arranged in the field in the processing of step S206. For example, the link usage object creating unit 252 reads the link usage object information corresponding to the arrangement shape of the multiple usage objects 1014 arranged in the field as illustrated in FIG. 16 from, for example, the link usage object information DB 222 of FIG. 14, and creates a link usage object based on the read link usage object information.

For example, when the arrangement shape of the multiple usage objects 1014 arranged in the field in the process of step S206 matches the link usage object information of the link usage object ID “Y001” in the link usage object information DB 222 of FIG. 14, the link usage object creating unit 252 creates the link usage object based on the link usage object information of the link usage object ID “Y001”.

In step S212, the link usage object creating unit 252 performs deletion processing of, for example, the multiple usage objects 1014 in FIG. 16 on which the link usage object created in step S210 is based. In step S214, the link usage object creating unit 252 performs arrangement processing of the link usage object created in step S210. For example, the link usage object creating unit 252 arranges a link usage object 1012 created in step S210 in a field as illustrated in FIG. 17.

The user character 1002 uses the link usage object 1012 in FIG. 17 as a step stool, a shield, etc., to battle with an enemy character 1010. By setting the strength of the link usage object 1012 to be stronger than the multiple usage objects 1014 in FIG. 16 that are used as the basis, the user character 1002 can proceed with the battle with the enemy character 1010 in an advantageous manner. The link usage object 1012 may be caused to break when used for a predetermined number of times. For example, the link usage object 1012 in FIG. 17 may be caused to break after enduring three charges by the enemy character 1010.

In step S216, the game control unit 230 determines whether the game is over and repeats the processing of steps S202 to S214 until it is determined that the game is over. When it is determined that the game is over, the game control unit 230 ends the processing of the flowchart in FIG. 15.

According to the second embodiment, a link usage object, which is an example of a new object, can be created from usage objects, and can be arranged in the field, by a simple operation of arranging multiple usage objects in the field. Therefore, according to the second embodiment, it is possible to provide the user with game playing having abundant variations using new objects.

The arrangement shape information in the link usage object information DB 222 in FIG. 14 is not limited to the arrangement shape connecting multiple usage objects, but may be an arrangement shape in which multiple usage objects are arranged to be spaced apart with predetermined intervals. The creation of the link usage object 1012 may be performed by a shortcut or the like from the second time. There may also be a link usage object that is formed by combining a usage object and a link usage object. Further, there may be a link usage object that is formed by combining multiple link usage objects.

In the second embodiment, the example in which the user character 1002 creates and uses the link usage object 1012 is explained, but the enemy may create and use the link usage object 1012. Further, during the creation of the link usage object 1012, the user character 1002 may be prevented from being destroyed by enemy attacks. The created link usage object 1012 may be given additional effects by actions such as magic by the user character 1002, or the use of items, or the providing of material objects, etc. The created link usage object 1012 may also be strengthened by actions such as magic by the user character 1002, or the use of items, or the providing of material objects, etc.

Further, in the second embodiment, points may be awarded when the user character 1002 has involved the link usage object 1012 in the play. In the second embodiment, according to the number of points accumulated, effects advantageous to the user may be given, such as strengthening the weapon or raising parameters such as attack force. Points may be accumulated for each type of the link usage object 1012 involved in the play, the type of weapon, or a combination of these.

A case where the user character 1002 has involved the link usage object 1012 in the play refers to a case where, for example, the combination of the link usage object 1012 and the weapon type triggers a change of action at the time of attack. Further, the case where the user character 1002 has involved the link usage object 1012 in the play refers to a case where, for example, the link usage object 1012 has been used to avoid the attack of the enemy. The case where the user character 1002 has involved the link usage object 1012 in the play refers to a case where, for example, the link usage object 1012 is continuously created within a predetermined time.

Further, giving an effect advantageous to the user, such as strengthening a weapon or raising a parameter such as an attack force, according to the number of points accumulated, for example, refers to a case of raising the attack force of a weapon being equipped by the user character 1002 for a predetermined time. Further, giving an effect advantageous to the user, according to the number of points accumulated, for example, refers to giving an attribute according to the type of points accumulated. An attribute may be water, fire, or lightning. Further, giving an effect advantageous to the user according to the number of points accumulated, for example, refers to changing the form of a weapon equipped by the user character 1002. For example, if the usage object is a sword, the shape thereof changes so that the blade becomes longer and the range of attack is expanded. In the case of a sword, for example, the shape of the sword changes to add a thorn to the blade. Further, giving an effect advantageous to the user according to the number of points accumulated, for example, refers to increasing the appearance rate of rewards with high rarity.

Further, the usage object creating unit 246 may consider collision priority as illustrated in, for example, FIG. 24 when arranging the link usage object. FIG. 24 illustrates an example in which the other objects that come in contact are NPCs, large enemy characters, and small enemy characters. The usage object creating unit 246 immediately destroys the link usage object 1012 when the link usage object 1012 is arranged at a position that contacts NPC. The usage object creating unit 246 immediately destroys the link usage object 1012 when the link usage object 1012 is arranged at a position that contacts a large enemy character. Further, when the link usage object 1012 is arranged at a position where the link usage object 1012 comes into contact with a small enemy character, the usage object creating unit 246 performs processing so that the small enemy character and the link usage object 1012 push each other.

The behavior at the time of arrangement of the link usage object 1012 thus created by the usage object creating unit 246 is made different depending on the type of the other object that comes into contact.

[Notes]

The description given in the second embodiment has been described such that a person skilled in the art can carry out the following invention.

[1]

An information processing apparatus that executes a game in which a user character takes action in a field in a virtual space based on an operation by a user, the information processing apparatus including:

a usage object creating unit configured to create a usage object based on the operation by the user, and to arrange the usage object in the field; and a link usage object creating unit configured to create a link usage object formed of a plurality of the usage objects based on an arrangement shape of the plurality of the usage objects, and to arrange the link usage object in the field.

[2]

The information processing apparatus according to note 1, wherein the link usage object creating unit creates the link usage object from the plurality of the usage objects based on the arrangement shape connecting the plurality of the usage objects of the same type of different types.

[3]

The information processing apparatus according to note 1 or 2, wherein the link usage object creating unit creates the link usage object that differs from the plurality of the usage objects in at least one of performance, appearance, and function.

[4]

The information processing apparatus according to note 1 or 2, wherein the link usage object can be used for the moving or the battling of the user character in the field.

[5]

The information processing apparatus according to note 4, wherein the user character changes an action according to a combination of the type of the link usage object used for the moving or the battling and the weapon time of the user character.

[6]

The information processing apparatus according to note 4, wherein the link usage object can be given one or both of additional effects and increased strength according to an operation by the user.

[7]

The information processing apparatus according to note 4, wherein the link usage object creating unit creates the link usage object according to an instruction from an enemy character that battles with the user character.

[8]

A program that causes an information processing apparatus that executes a game in which a user character takes action in a field in a virtual space based on an operation by a user, to function as:

a usage object creating unit configured to create a usage object based on the operation by the user, and to arrange the usage object in the field;

a link usage object creating unit configured to create a link usage object formed of a plurality of the usage objects based on an arrangement shape of the plurality of the usage objects, and to arrange the link usage object in the field.

[9]

A link usage object creating method by an information processing apparatus that executes a game in which a user character takes action in a field in a virtual space based on an operation by a user, the link usage object creating method including:

a step of creating a usage object based on the operation by the user, and arranging the usage object in the field; and a step of creating a link usage object formed of a plurality of the usage objects based on an arrangement shape of the plurality of the usage objects, and arranging the link usage object in the field.

Third Embodiment

The link usage object of the second embodiment cannot be created from the beginning, but if the link usage object can be newly created when a predetermined condition is satisfied in the game, the properties of game playing such as searching for a predetermined condition can be improved. Therefore, the third embodiment aims to make it possible to learn about a link usage object that can be created from multiple usage objects. Note that the third embodiment is similar to the first and second embodiments with some exceptions, so the explanation will be omitted as appropriate. The system configuration and hardware configuration are the same as those in the first and second embodiments.

[Functional Blocks]

In the following, an example of a functional configuration in which the information processing apparatus 10 receives an operation for a game being executed from a user such as a player, generates and displays an image of the game in response to the operation, and causes the user to play the game, is described. The functional configuration illustrated in FIG. 18 is an example, and for example, at least part of the functional configuration illustrated in FIG. 18 may be provided in the server apparatus 14 so that the information processing apparatus 10 and the server apparatus 14 cooperate with each other to perform processing.

Figure 18:
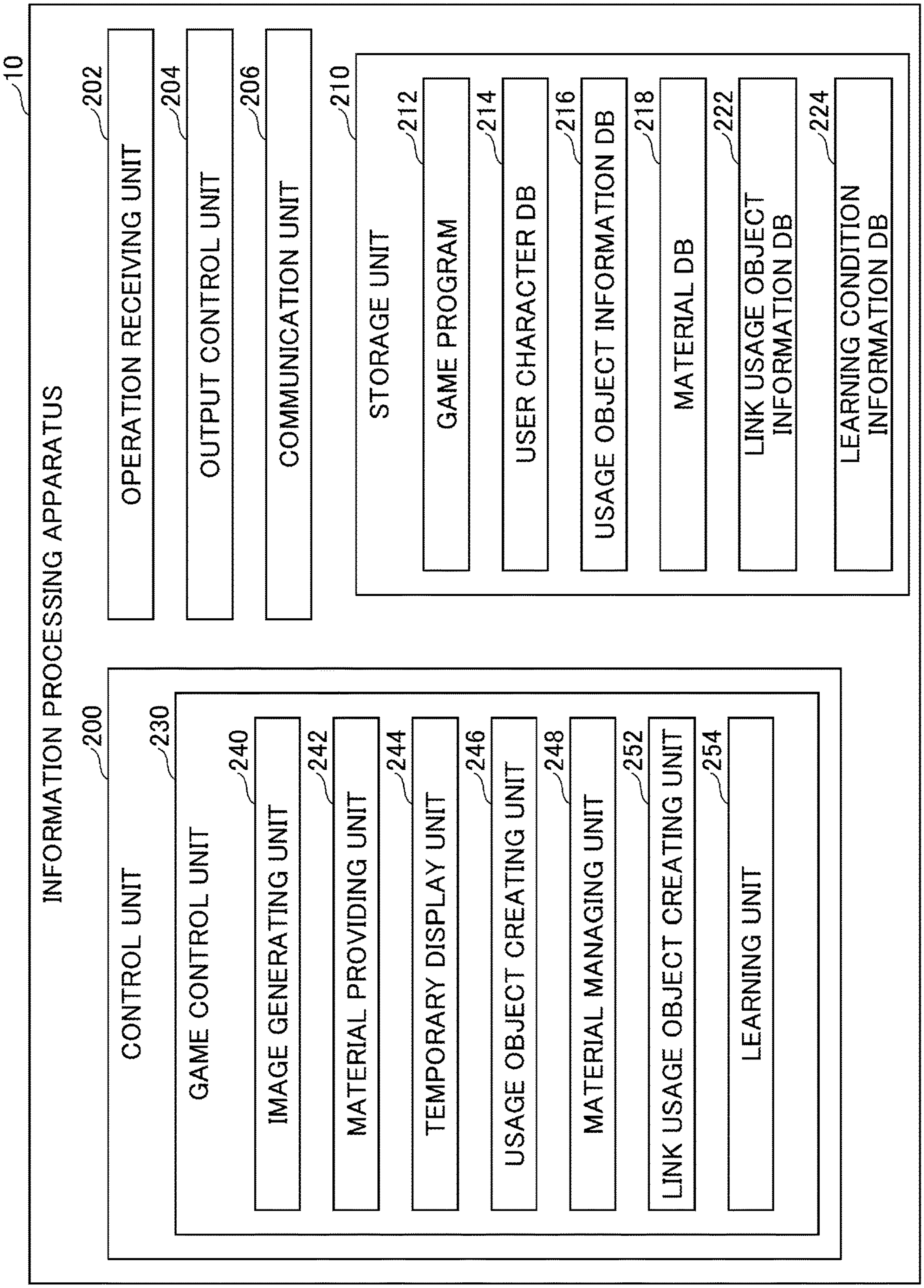
FIG. 18 is a diagram illustrating an example of the functional configuration of the information processing apparatus according to a third embodiment.

FIG. 18 is a diagram illustrating an example of the functional configuration of the information processing apparatus according to the third embodiment. The information processing apparatus 10 in FIG. 18 includes the control unit 200, the operation receiving unit 202, the output control unit 204, the communication unit 206, and the storage unit 210.

The storage unit 210 in FIG. 18 stores the game program 212, the user character DB 214, the usage object information DB 216, the material DB 218, the link usage object information DB 222, and a learning condition information DB 224. The storage unit 210 may be implemented by the storage device 102 or by a storage device connected via the network 18 or the like.

The game program 212 is an example of a game processing program executed by the CPU 100. The user character DB 214 stores information about user characters displayed in game images. The usage object information DB 216 stores information about usage objects that can be created by user characters from materials in a game. The material DB 218 stores information about material objects needed to create usage objects in a game. The link usage object information DB 222 stores information about link usage objects that can be created by user characters from usage objects in a game.

The learning condition information DB 224 stores information about the learning condition for the user character to be able to create a new link usage object (learn the link usage object). Details of the learning condition information DB 224 will be described later.

The control unit 200 controls the entire information processing apparatus 10. The overall control of the information processing apparatus 10 includes the control of receiving an operation from the user on a game being executed and generating and displaying an image of the game in response to the operation.

The control unit 200 is implemented by the CPU 100 executing the processing described in a program such as the game program 212. The control unit 200 in FIG. 12 includes the game control unit 230. The game control unit 230 includes the image generating unit 240, the material providing unit 242, the temporary display unit 244, the usage object creation unit 246, the material managing unit 248, the link usage object creation unit 252, and a learning unit 254.

The game control unit 230 performs overall control related to the game. Based on the user's operation, the game control unit 230 executes game processing of a game in which the user character takes action in the field of a virtual space.

The image generating unit 240 generates an image of the game according to the game processing being executed by the game control unit 230, and causes the output device 108 to display the image as a screen of the game. The material providing unit 242 controls the providing of material objects to the user character according to the game processing being executed by the game control unit 230.

According to the game processing being executed by the game control unit 230, the temporary display unit 244 temporarily displays the link usage object that the user character has become able to create by learning. The temporary display may be a display process that indicates to the user that a link usage object can be created or has become creatable, and may not indicate the accurate position in the field where the link usage object is to be arranged. For example, a temporary display allows the user to notice a link usage object that can be newly created.

Based on the user's operation, the usage object creating unit 246 creates a usage object from the material object and arranges the usage object in the field. The material managing unit 248 manages information about material objects that can be acquired by user characters from the field.

Based on the user's operation, the link usage object creating unit 252 creates a temporarily displayed link usage object and arranges the link usage object in the field. For example, the link usage object creating unit 252 creates a link usage object from multiple usage objects and arranges the link usage object in a field.

Based on the information about the learning conditions stored in the learning condition information DB 224, the learning unit 254 learns a new link usage object that can be created from the multiple usage objects when the user character satisfies a predetermined condition (learning condition) in the game. The learning conditions can be conditions that can be satisfied during a battle with enemy characters, or conditions that can be satisfied while moving through the field.

The operation receiving unit 202 receives various operations by the user on the input device 106. The output control unit 204 displays various screens on the output device 108 under the control of the control unit 200. The operation receiving unit 202 is implemented by the CPU 100 controlling the input device 106 according to a program. The output control unit 204 is implemented by the CPU 100 controlling the output device 108 according to a program. The user's various operations on the input device 106 refer to operations in which the user operates the operation receiving unit 202 to cause the CPU 100 to execute processing. The output control unit 204 displays various screens and outputs sound according to the control of the control unit 200.

The communication unit 206 communicates via the network 18 or the like. The communication unit 206 is implemented by the CPU 100 executing a program and controlling the communication device 104 according to the program.

[Data Configuration]

The data configuration of the learning condition information DB 224 is described. The data configurations of the user character DB 214, the usage object information DB 216, the material DB 218, and the link usage object information DB 222 are the same as those of the first or second embodiment, and, therefore, descriptions thereof are omitted. Further, the data configuration in FIG. 19 indicates items necessary for the explanation of the third embodiment, and other items are omitted as appropriate.

FIG. 19 is a configuration diagram illustrating an example of the learning condition information DB. The learning condition information DB 224 in FIG. 19 stores a link usage object ID, a learning condition, and a learned flag in association with each other as information related to the learning condition for enabling the user character to create a new link usage object (learn the link usage object).

The link usage object ID is an example of identification information of a link usage object. A learning condition is a condition that enables a user character to create a new link usage object.

For example, one of the learning conditions illustrated in FIG. 19 is to "watch the rushing attack of an enemy character a". With this learning condition, the user character watches the rushing attack of the enemy character a in the game and then learns the link usage object of the link usage object ID "Y001" that can counter the rushing attack. Learning link usage objects can be expressed as inspiration, awareness, etc.

Further, one of the learning conditions illustrated in FIG. 19 is to "watch a valley landform with a width of 5 m or more". With this learning condition, the user character watches a valley landform with a width of 5 m or more in the game, and then learns the link usage object with the link usage object ID "Y002" that can correspond to the valley landform.

Further, one of the learning conditions illustrated in FIG. 19 is to "watch the attack of the enemy character a on X001×6 arranged in a shape 001". With this learning condition, the user character watches the attack of the enemy character a on the usage objects linked in a stacked manner in the game, and then learns the link usage object of the link usage object ID "Y003" that can counter the attack.

The learned flag is information indicating whether the link usage object identified by the link usage object ID has been learned. The user character can create a link usage object for which the learned flag is 'ON'. Thus, once the user character has learned the link usage object, the user character can create the learned link usage object at any time.

With the learning condition information DB 224 illustrated in FIG. 19, the game control unit 230 can manage the learning condition under which the user character learns a new link usage object and the information of the link usage object that the user character has learned.

[Processing]

Figure 20:
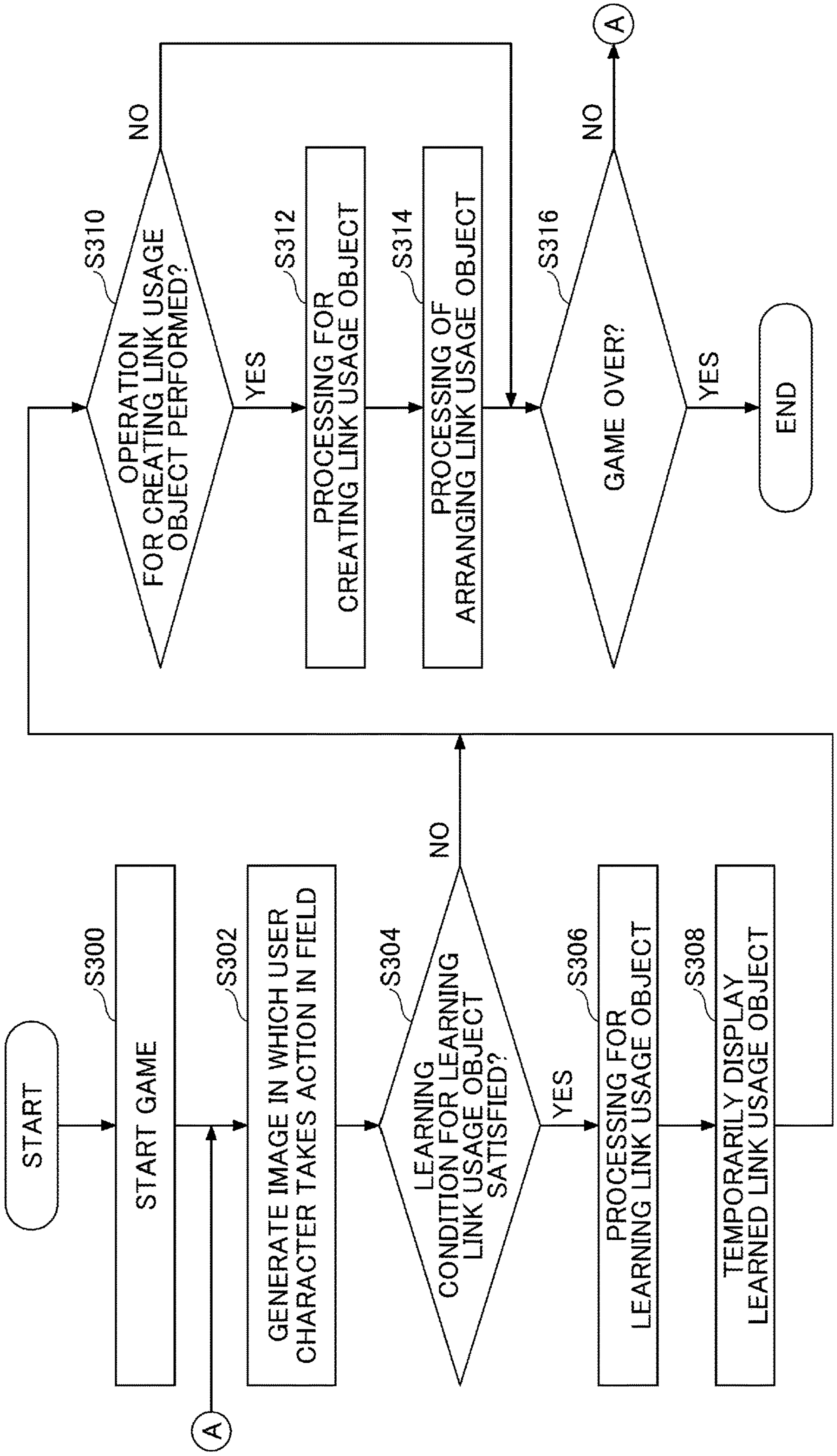
FIG. 20 is a flowchart of one example of processing of a game system according to the third embodiment.

An example of processing in which the game system according to the third embodiment receives an operation for a game from a user, generates an image of the game according to the operation, and displays (outputs) the image on the output device 108 is described below. FIG. 20 is a flowchart of one example of the processing of the game system according to the third embodiment.

Figure 21:
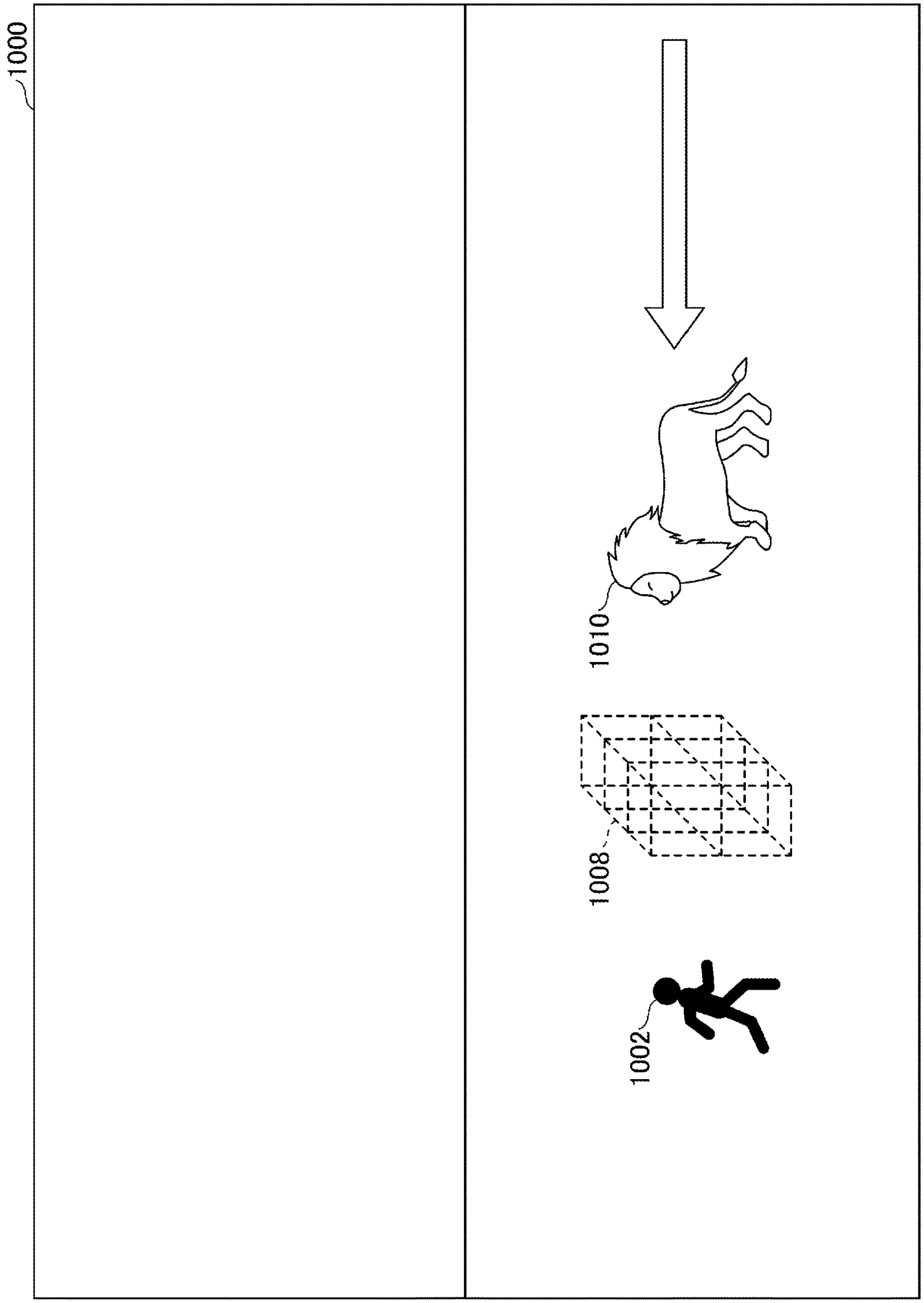
FIG. 21 is an image diagram of an example of an image of a user character taking action in a field.
Figure 22:
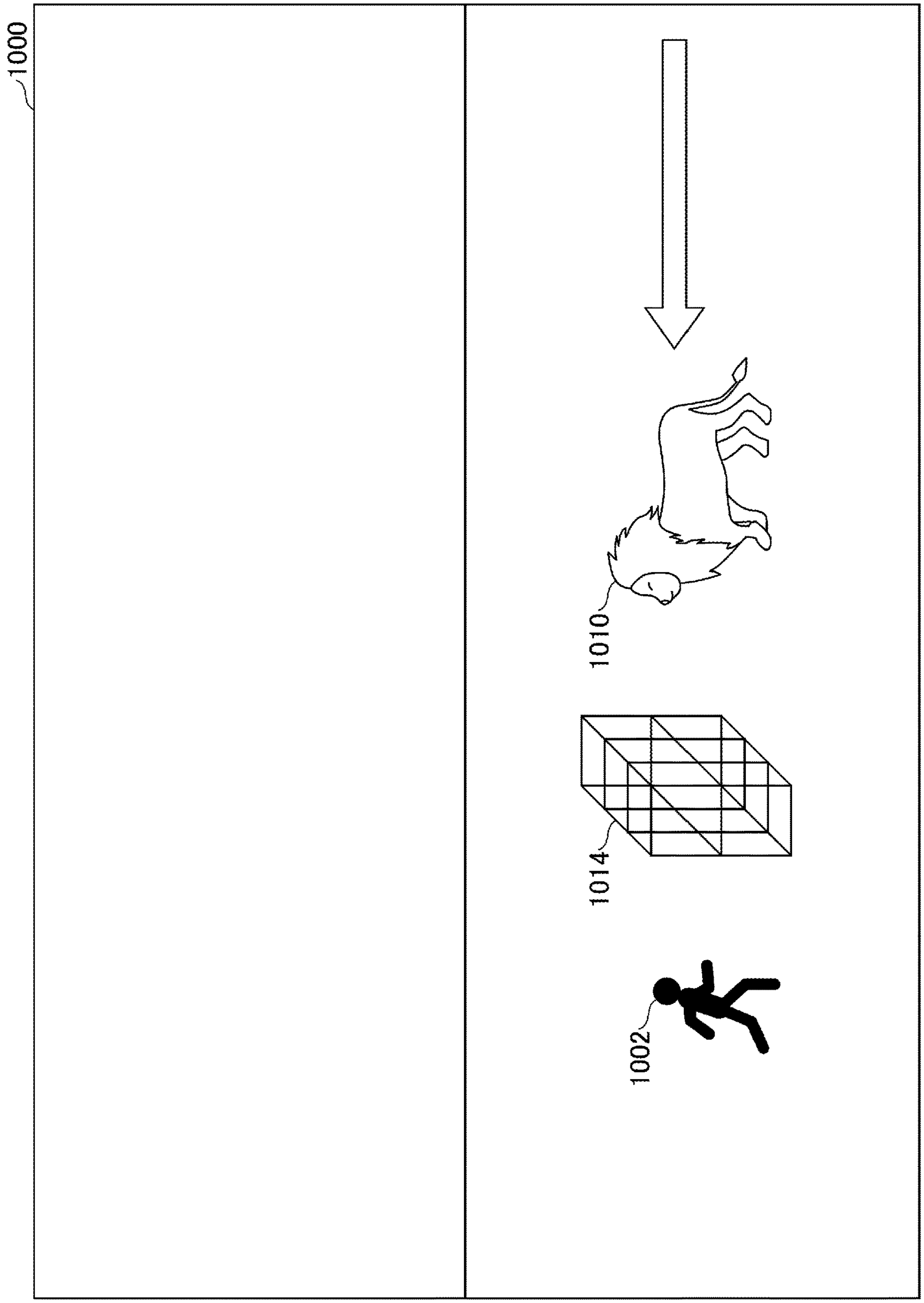
FIG. 22 is an image diagram of an example of an image of a user character taking action in a field.
Figure 23:
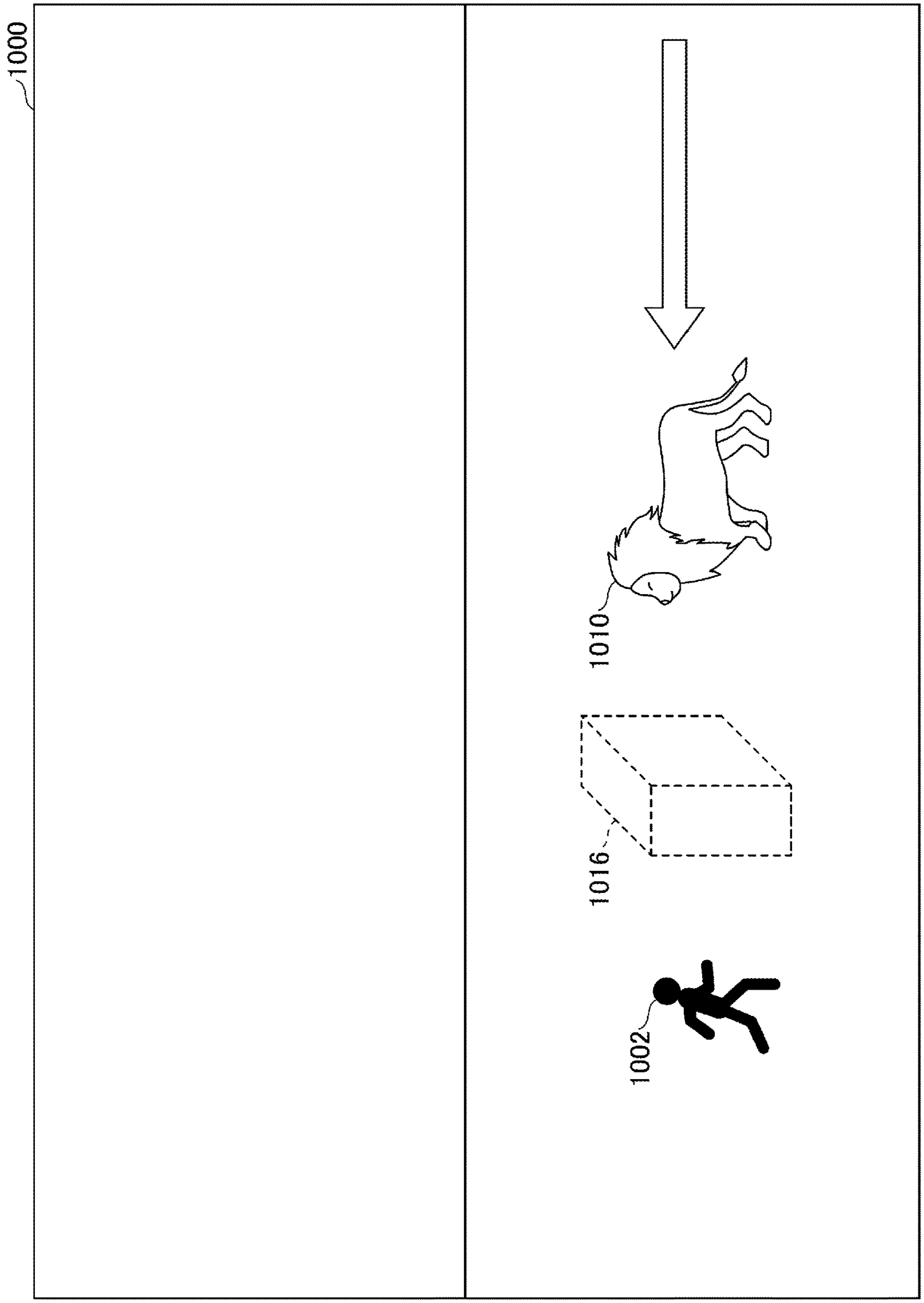
FIG. 23 is an image diagram of an example of an image of a user character taking action in a field.

FIGS. 21 to 23 are image diagrams of an example of an image of a user character taking action in a field. The image 1000 of FIGS. 21 to 23 indicates an example of a game screen in which the user character 1002 takes action in the field. The user character 1002 takes action in the field and collects the necessary material objects, which enables the creation of usage objects. Further, the user character 1002 can learn the link usage object by satisfying the learning condition in the field, and it becomes possible to create the learned link usage object. The information processing apparatus 10 executes game processing of the game in which the user character 1002 takes action in the field based on the user's operation.

In step S300, the game control unit 230 of the information processing apparatus 10 starts game processing of the game in which the user character 1002 takes action in the game. In step S302, the image generating unit 240 generates an image in which the user character 1002 takes action in the field based on the user's operation and causes the output device 108 to display the image. The user character 1002 takes action in the field illustrated in, for example, FIGS. 21 to 23, and by collecting the necessary material objects, it is possible to create a usage object.

In step S304, the learning unit 254 determines whether a learning condition for learning a link usage object has been satisfied. When the learning condition for learning the link usage object is not satisfied, the learning unit 254 skips the processing of steps S306 to S308. On the other hand, when the learning condition for learning the link usage object is satisfied, the learning unit 254 performs the processing of step S306.

In step S306, the learning unit 254 performs the processing of learning the link usage object to enable creation of the link usage object corresponding to the satisfied learning condition. The processing of learning the link usage object in step S306 includes a process to set the learned flag of the link usage object corresponding to the satisfied learning condition to "ON".

Note that the learning process of the link usage object may be successful or unsuccessful. For example, when the learning condition is satisfied, the learning unit 254 starts to guide the creation of the link usage object corresponding to the learning condition. The guiding of the creation of a link usage object is done by visually indicating the type and arrangement shape of the usage object to be created. During the guiding, the attack, etc., from the enemy character 1010 is interrupted or delayed. Delaying refers to, for example, slowing down the time in the game or performing a motion that does not involve a determination of an attack from the enemy character 1010. If an action following the guidance cannot be completed within a predetermined time, the user fails the learning process of the link usage object. Attack from the enemy character 1010 resumes according to the failure in the learning process of the link usage object. The learning process of the link usage object is successful if the action following the guidance can be completed within the predetermined time.

The condition under which the guiding of the creation of the link usage object is started may be, for example, seeing the attack of the enemy character 1010, the degree of elevation of the user character's status, the progress of the battle, or the like.

In step S308, the temporary display unit 244 temporarily displays the link usage object that the user character has become able to create by learning. For example, FIG. 21 is a diagram illustrating an example in which the temporary object 1008 is displayed to cause the user to notice that the creation of a link usage object has become possible by satisfying the learning condition of "watching the rushing attack of an enemy character 1010". After watching the rushing attack of the enemy character 1010, the user can notice that it is now possible to create a link usage object that can counter the rushing attack of the enemy character 1010 by watching the display of the temporary object 1008.

In step S310, the link usage object creating unit 252 determines whether an operation to create a learned link usage object has been received from the user. When an operation to create the learned link usage object is not received from the user, the link usage object creating unit 252 skips the processing of steps S312 to S314. On the other hand, when an operation to create a learned link usage object is received from the user, the usage object creating unit 246 performs the processing of step S312.

In step S312, the link usage object creating unit 252 performs processing of creating the link usage object that has been learned. In step S314, the link usage object creating unit 252 performs processing of arranging the link usage object created in step S312. For example, the link usage object creating unit 252 arranges the link usage object created in step S312 near the temporary object 1008 in FIG. 21.

Therefore, the user can create a learned link usage object and arrange the learned link usage object in the field, for example, as a wall to prevent a rushing attack by the enemy character 1010. Further, the user can also use the arranged link usage object 1012 as a step stool or the like in a battle with an enemy character 1010. By arranging link usage objects, the user character 1002 proceeds with the battle with the enemy character 1010 in an advantageous manner.

In step S316, the game control unit 230 determines whether the game is over and repeats the processing of steps S302 to S314 until the game is determined to be over. When it is determined that the game is over, the game control unit 230 ends the processing of the flowchart in FIG. 20.

The image 1000 in FIG. 21 is one example, and for example, a link usage object that is stronger than the case of stacking the multiple usage objects 1014 may be learned, by watching the attack of the enemy character 1010 on the multiple usage objects 1014 arranged as in the image 1000 in FIG. 22 (such as an attack to destroy the multiple usage objects 1014 stacked as a wall). Moreover, by watching the multiple usage objects 1014 arranged as in the image 1000 of FIG. 22, it is possible to learn about a link usage object different from the usage object created by linking the multiple usage objects 1014. Note that there are various conditions for learning the link usage object, and the condition is not limited to contents in the field, but the link usage object may be learned by achieving a particular condition such as consumption of items or materials at the base location.

Further, the image 1000 in FIG. 21 is one example, and instead of the temporary display of the temporary object 1008 for causing the user to imagine the multiple usage objects before creating the link usage object, the temporary display of a temporary object 1016 as illustrated in FIG. 23 for causing the user to imagine the link usage object after being created, may be used.

According to the third embodiment, by satisfying a predetermined condition in the game, it is possible to learn about a link usage object that has not been possible to create, and the properties of game playing such as searching for a predetermined condition can be improved. The user object that cannot be created may be learned by satisfying a predetermined condition in the game. The user character may also learn the link usage object by looking at the link usage object created by another user's user character or an enemy character. The learning conditions of the usage object or the link usage object may or may not be informed to the user in advance.

The learning unit 254 may learn the recipe of the link usage object that could not be created, by satisfying a predetermined condition in the game. The recipe records, for example, arrangement shape information and performance functions, which are items in the link usage object information DB of FIG. 14.

In the third embodiment, the example in which the user character 1002 learns the link usage object 1012 is explained, but the enemy character 1010 may look at the link usage object 1012 and learn how to deal with the link usage object 1012. For example, the enemy character 1010 sees the link usage object 1012 that is a wall and learns a rushing attack of a trajectory that avoids the wall. The NPC may learn to create a link usage object 1012 by looking at the link usage object 1012.

[Notes]

The description given in the third embodiment has been described such that a person skilled in the art can carry out the following invention.

[1]

An information processing apparatus that executes a game in which a user character takes action in a field in a virtual space based on an operation by a user, the information processing apparatus including:

a usage object creating unit configured to create a usage object based on the operation by the user, and to arrange the usage object in the field;

a learning unit configured to learn about a link usage object that can be created from a plurality of the usage objects based on a predetermined condition that has occurred in the field;

a temporary display unit configured to temporarily display the link usage object that has become possible to create by the learning; and a link usage object creating unit configured to create the link usage object based on an operation by the user and arrange the link usage object in the field.

[2]

The information processing apparatus according to note 1, wherein the learning unit learns the link usage object that can be created from a plurality of the usage objects, based on an attack of an enemy character in the field.

[3]

The information processing apparatus according to note 1 or 2, wherein the learning unit learns the link usage object that can be created from a plurality of the usage objects, based on a landform of the field.

[4]

The information processing apparatus according to note 1 or 2, wherein the learning unit learns the link usage object that can be created from a plurality of the usage objects, based on an arrangement shape of the plurality of the usage objects arranged in the field.

[5]

The information processing apparatus according to note 1 or 2, wherein the learning unit starts to guide the creating of the link usage object based on the predetermined condition, and when the user completes an action according to the guiding within a predetermined time, the learning of the link usage object is determined to be successful.

[6]

The information processing apparatus according to note 5, wherein the learning unit interrupts or delays the battle with the enemy character, from the start to the end of the guiding of the creation of the link usage object.

[7]

A program that causes an information processing apparatus that executes a game in which a user character takes action in a field in a virtual space based on an operation by a user, to function as:

a usage object creating unit configured to create a usage object based on the operation by the user, and to arrange the usage object in the field;

a learning unit configured to learn about a link usage object that can be created from a plurality of the usage objects based on a predetermined condition that has occurred in the field;

a temporary display unit configured to temporarily display the link usage object that has become possible to create by the learning; and a link usage object creating unit configured to create the link usage object based on an operation by the user and arrange the link usage object in the field.

[8]

A link usage object creating method by an information processing apparatus that executes a game in which a user character takes action in a field in a virtual space based on an operation by a user, the link usage object creating method including:

a step of creating a usage object based on the operation by the user, and arranging the usage object in the field;

a step of learning a link usage object that can be created from a plurality of the usage objects based on a predetermined condition that has occurred in the field;

a step of temporarily displaying the link usage object that has become possible to create by the learning; and a step of creating the link usage object based on an operation by the user and arranging the link usage object in the field.

Fourth Embodiment

For example, in a craft game, when construction or the like is carried out in a field, there have been cases where making things cannot be carried out unless the user performs an operation to start making things and displays a screen for making things. Therefore, if the user can make things in the field without displaying a screen for making things or the like, it is possible to make things in the field without reducing the action properties of the game.

Therefore, the fourth embodiment aims to make it possible to create usage objects and link usage objects in a field without reducing action properties. The fourth embodiment is similar to the first to third embodiments with some exceptions, and, therefore, the description is omitted as appropriate.

For example, the temporary objects 1008 and 1016 illustrated in the first to third embodiment need only indicate to the user the approximate positions in the field in which the usage object and the link usage object are to be arranged, and do not indicate the accurate positions in the field in which the usage object and the link usage object are to be arranged. If it is not necessary to indicate the accurate position in the field where the usage object and the link usage object are to be arranged, the processing load for displaying the temporary objects 1008 and 1016 in the field indicated in the first to third embodiment is significantly reduced compared to the case of indicating the accurate position in the field where the usage object and the link usage object are to be arranged. For example, the temporary objects 1008 and 1016 illustrated in the first to third embodiments are represented by translucent box-like objects or the like or by objects or the like that are shaped as translucent boxes expressed by contour lines. The temporary display unit 244 does not determine whether the usage object and the link usage object can be actually arranged at positions. That is, the temporary display unit 244 temporarily displays the temporary objects 1008 and 1016, regardless of whether the usage object and the link usage object can be arranged.

Further, the temporary objects 1008 and 1016 indicating the position of the field where the usage object and the link usage object cannot be arranged may be hidden, or displayed in a different color (e.g., red) from that of the position where these can be arranged, or displayed with a cross mark.

When the temporary objects 1008 and 1016 cannot be laid out at a predetermined distance due to obstacles or the like, these are laid out closer to the user character. The temporary objects 1008 and 1016 do not indicate the accurate position in the field at which the usage object and the link usage object are to be arranged, but the temporary objects 1008 and 1016 can usually be moved. Usual movement is to move the positions of the temporary objects 1008 and 1016 in response to the user's operation via the operation receiving unit 202. The temporary display unit 244 regularly moves the positions of the temporary objects 1008 and 1016, for example, when the user character is standing. It is also conceivable that the user wants to move the temporary objects 1008 and 1016 with more precision than regular movement. Therefore, when the user character is in a squatting state, for example, the temporary display unit 244 moves the positions of the temporary objects 1008 and 1016 more accurately than the regular movement. The temporary display unit 244 switches the moving accuracy of the temporary objects 1008 and 1016 to be moved by the user character changing from a standing state to a squatting state in response to the user's operation via the operation receiving unit 202.

The temporary objects 1008 and 1016 are not limited to being displayed when arranging the usage object and the link usage object, and may be displayed as a destroy object at the time of destroying (deleting) the usage object and the link usage object. For example, a temporary object used only at the time of destroying a usage object and a link usage object may be provided as a destroy object. Destroy objects are used to specify at least some of the usage objects or link usage objects to be destroyed. Destroy objects may be resized by user operation. A destroy object destroys a usage object or a link usage object at an overlapping position.

The temporary objects 1008 and 1016 used at the time of deletion of a usage object or a link usage object may be hidden or may remain displayed after deletion of a usage object or a link usage object.

Further, when the temporary objects 1008 and 1016 are used to set a usage object or a link usage object, the performance function of a usage object or a link usage object may be improved compared with the case where the temporary objects 1008 and 1016 are not used to set a usage object or a link usage object.

On the contrary, if a usage object or a link usage object is set without using the temporary objects 1008 and 1016, the performance function of a usage object or a link usage object may be improved compared with the case where the temporary objects 1008 and 1016 are used to set a usage object or a link usage object.

According to the fourth embodiment, the usage object and the link usage object can be created and arranged in the field while the user character is taking action, so that the action properties of the game are not degraded.

[Notes]

The description given in the fourth embodiment has been described such that a person skilled in the art can carry out the following invention.

[1]

An information processing apparatus that executes a game in which a user character takes action in a field in a virtual space based on an operation by a user, the information processing apparatus including:

a temporary display unit configured to temporarily display at a position a usage object or a link usage object that can be created and arranged in the field by the user character while taking action, without determining whether the usage object or the link usage object can be actually arranged at the position; and a usage object creating unit configured to create the usage object that is temporarily displayed by the user character while taking action and to arrange the usage object in the field, based on the operation of the user.

[2]

The information processing apparatus according to note 1, further comprising:

a link usage object creating unit configured to create the link usage object that is temporarily displayed by the user character while taking action and to arrange the link usage object in the field, based on the operation of the user.

[3]

The information processing apparatus according to note 2, wherein the temporary display unit temporarily displays the usage object or the link usage object in a translucent manner or a transparent manner expressed by contour lines in the field.

[4]

The information processing apparatus according to note 2 or 3, wherein the temporary display unit temporarily displays the link usage object that can be newly created, in a translucent manner or a transparent manner expressed by contour lines in the field.

[5]

The information processing apparatus according to note 2 or 3, wherein the temporary display unit temporarily displays the usage object or the link usage object according to a position of the user character taking action in the field, in a translucent manner or a transparent manner expressed by contour lines.

[6]

The information processing apparatus according to any one of notes 1 to 5, wherein the temporary display unit receives, from the user by temporary display, a specification of deleting at least one of the usage object or the link usage object.

[7]

The information processing apparatus according to any one of notes 1 to 6, wherein the temporary display unit switches the movement of the usage object or the link usage object from regular movement to a movement that is more accurate than the regular movement, based on the state of the user character.

[8]

A program that causes an information processing apparatus that executes a game in which a user character takes action in a field in a virtual space based on an operation by a user, to function as:

a temporary display unit configured to temporarily display at a position a usage object or a link usage object that can be created and arranged in the field by the user character while taking action, without determining whether the usage object or the link usage object can be actually arranged at the position; and a usage object creating unit configured to create the usage object that is temporarily displayed by the user character while taking action and to arrange the usage object in the field, based on the operation of the user.

[9]

A temporary display method executed by an information processing apparatus that executes a game in which a user character takes action in a field in a virtual space based on an operation by a user, the temporary display method including:

a step of temporarily displaying at a position a usage object or a link usage object that can be created and arranged in the field by the user character while taking action, without determining whether the usage object or the link usage object can be actually arranged at the position; and a step of creating the usage object that is temporarily displayed by the user character while taking action and arranging the usage object in the field, based on the operation of the user.

The disclosed information processing apparatus in the first to fourth embodiments should be considered illustrative and not restrictive. The first to fourth embodiments can be modified and improved in various forms without deviating from the scope and intent of the attached claims. Further, the matters described in the first to fourth embodiments can have other configurations to the extent that they are not inconsistent, and can be combined to the extent that they are not inconsistent.

According to one embodiment of the present invention, it is possible to cause the user to notice the position at which the usage object is to be created from the material object.

What is claimed is:

1. An information processing apparatus comprising:
a memory and a processor connected to the memory; and
a display,
wherein the processor is configured to:
in a craft game, generate an image in which a user character acts in a field in a virtual space, and display the image on the display,
make the user character act in the field based on a user's operation via an input device, and provide, to the user character, a material object based on position information in the field of the user character that is taking action and position information in the field of the material object;
temporarily display, on the display, a usage object that the user character can create, with an appearance that is recognizable to the user, based on the position information in the field of the user character that is taking action and the position information in the field of the usage object; and
create, in the field, the usage object that is being temporarily displayed, by consuming the material object possessed by the user character, based on an operation of the user.

2. The information processing apparatus according to claim 1, wherein the temporary display unit temporarily displays, in such a manner as to be noticeable by the user, the usage object that can be created by the user character according to the position in the field of the user character, together with a display of the user character that is taking action.

3. The information processing apparatus according to claim 1, wherein the material providing unit displays, in such a manner as to be noticeable by the user, a position of the material object to be provided to the user character based on an operation by the user, according to the position in the field of the user character that is taking action.

4. The information processing apparatus according to claim 1, wherein the temporary display unit temporarily displays, in such a manner as to be noticeable by the user, a position at which the usage object can be created, when the position in the field of the user character that is taking action approaches a predetermined range from the position at which the usage object can be created.

5. The information processing apparatus according to claim 1, wherein the usage object can be used by the user character for a movement or a battle in the field.

6. The information processing apparatus according to claim 5, wherein the action of the user character changes according to a combination of a type of the usage object used for the battle in the field and a weapon type of the user character.

7. The information processing apparatus according to claim 5, wherein the usage object can be given one or both of an additional effect and increased strength according to an operation by the user.

8. The information processing apparatus according to claim 5, wherein the usage object creating unit creates the usage object according to an instruction from an enemy character that performs the battle with the user character.

9. A non-transitory computer-readable recording medium storing a program that causes a computer to execute a process performed in an information processing apparatus, the process comprising:
in a craft game, generating an image in which a user character acts in a field in a virtual space, and displaying the image on a display,
making the user character act in the field based on a user's operation via an input device, and providing, to the user character, a material object based on position information in the field of the user character that is taking action and position information in the field of the material object;
temporarily displaying a usage object that the user character can create, with an appearance that is recognizable to the user, based on the position information in the field of the user character that is taking action and the position information in the field of the usage object; and
creating, in the field, the usage object that is being temporarily displayed, by consuming the material object possessed by the user character, based on an operation of the user.

10. A usage object creating method performed by an information processing apparatus configured to execute a game in which a user character takes action in a field in a virtual space based on an operation by a user, the usage object creating method comprising:
in a craft game, generating an image in which a user character acts in a field in a virtual space, and displaying the image on a display,
making the user character act in the field based on a user's operation via an input device, and providing, to the user character, a material object based on position information in the field of the user character that is taking action and position information in the field of the material object;
temporarily displaying a usage object that the user character can create, with an appearance that is recognizable to the user, based on the position information in the field of the user character that is taking action and the position information in the field of the usage object; and
creating, in the field, the usage object that is being temporarily displayed, by consuming the material object possessed by the user character, based on an operation of the user.

11. The information processing apparatus according to claim 1, wherein the processor is configured to:
in a case in which an arrangement shape of the usage object is set as arrangement shape information of a link usage object, create the link usage object.

12. The information processing apparatus according to claim 1, wherein the processor is configured to:
in a case in which the user character satisfies a learning condition for creating a predetermined link usage object, temporarily display, on the display, the predetermined link usage object, with an appearance that is recognizable to the user; and create, in the field, the link usage object that is being temporarily displayed, by consuming the usage object possessed by the user character, based on an operation of the user.

* * * * *